(12) United States Patent
Urness et al.

(10) Patent No.: US 11,782,273 B2
(45) Date of Patent: Oct. 10, 2023

(54) COMB-SHIFTED SKEW MIRRORS

(71) Applicant: Akonia Holographies LLC, Longmont, CO (US)

(72) Inventors: Adam Urness, Louisville, CO (US); Mark R. Ayres, Boulder, CO (US); Jonathan Pfeiffer, Lafayette, CO (US); Friso Schlottau, Lyons, CO (US); Kenneth E. Anderson, Longmont, CO (US)

(73) Assignee: Akonia Holographics LLC, Longmont, CO (US)

( * ) Notice: Subject to any disclaimer, the term of this patent is extended or adjusted under 35 U.S.C. 154(b) by 0 days.

(21) Appl. No.: 16/646,935

(22) PCT Filed: Sep. 27, 2018

(86) PCT No.: PCT/US2018/053155
§ 371 (c)(1),
(2) Date: Mar. 12, 2020

(87) PCT Pub. No.: WO2019/070504
PCT Pub. Date: Apr. 11, 2019

(65) Prior Publication Data
US 2020/0264435 A1 Aug. 20, 2020

Related U.S. Application Data

(60) Provisional application No. 62/568,270, filed on Oct. 4, 2017.

(51) Int. Cl.
*G03H 1/28* (2006.01)
*G02B 27/01* (2006.01)
(Continued)

(52) U.S. Cl.
CPC ....... *G02B 27/0172* (2013.01); *G02B 5/1823* (2013.01); *G02B 5/1861* (2013.01);
(Continued)

(58) Field of Classification Search
None
See application file for complete search history.

(56) References Cited

U.S. PATENT DOCUMENTS 4,017,158 A 4/1977 Booth
4,930,847 A 6/1990 Cederquist
(Continued)

FOREIGN PATENT DOCUMENTS

CN 1774661 A 5/2006
CN 103562802 A 2/2014
(Continued)

OTHER PUBLICATIONS

ONDAX, INC., "Volume Holographic Gratings (VHG)," 2005, pp. 1,4.
(Continued)

*Primary Examiner* — Jennifer D. Carruth
(74) *Attorney, Agent, or Firm* — Michael H. Lyons

(57) ABSTRACT

Optical systems having comb-shifted sets of holograms across different regions of a grating medium are disclosed. A first set of holograms may be formed in a first region of the grating medium and a second set of holograms may be formed in a second region of the grating medium. Each of the holograms in the first set may have a different respective grating frequency from a first set of grating frequencies. Each of the holograms in the second set may have a different respective grating frequency from a second set of grating frequencies. The second set of grating frequencies may be located within adjacent frequency gaps between the grating frequencies in the first set of grating frequencies. Comb- (Continued)

shifted sets of holograms may be used to perform pupil equalization, output coupling, input coupling, cross coupling, or other operations.

20 Claims, 15 Drawing Sheets

(51) Int. Cl.
G02B 5/18 (2006.01)
G02B 5/32 (2006.01)
G03H 1/26 (2006.01)

(52) U.S. Cl.
CPC ............... *G02B 5/32* (2013.01); *G03H 1/26* (2013.01); *G03H 1/2645* (2013.01); *G03H 1/28* (2013.01); *G02B 2027/0174* (2013.01); *G03H 2001/2605* (2013.01)

(56) References Cited

U.S. PATENT DOCUMENTS

| | | | |
|---|---|---|---|
| 6,882,452 B2 | 4/2005 | Decker et al. | |
| 7,139,109 B2 | 11/2006 | Mukawa | |
| 7,162,136 B1 | 1/2007 | Pertl et al. | |
| 7,418,170 B2 | 8/2008 | Mukawa et al. | |
| 7,502,168 B2 | 3/2009 | Akutsu et al. | |
| 7,764,413 B2 | 7/2010 | Levola | |
| 8,160,411 B2 | 4/2012 | Levola et al. | |
| 8,233,204 B1 | 7/2012 | Robbins et al. | |
| 8,446,675 B1 | 5/2013 | Wang et al. | |
| 8,665,178 B1 | 3/2014 | Wang | |
| 8,903,207 B1 | 12/2014 | Brown et al. | |
| 9,075,184 B2 | 7/2015 | Popovich et al. | |
| 9,207,461 B2 | 12/2015 | Frankel et al. | |
| 9,341,846 B2 | 5/2016 | Popovich et al. | |
| 9,456,744 B2 | 10/2016 | Popovich et al. | |
| 9,651,368 B2 | 5/2017 | Abovitz et al. | |
| 10,175,478 B2 | 1/2019 | Tekolste et al. | |
| 10,539,799 B2 | 1/2020 | St. Hilaire | |
| 10,859,833 B2 | 12/2020 | Bablumyan | |
| 10,976,550 B2 | 4/2021 | Ayres et al. | |
| 10,983,263 B2 | 4/2021 | Kleinman et al. | |
| 11,119,261 B1* | 9/2021 | Ayres ..................... G02B 5/32 | |
| 2002/0191394 A1 | 12/2002 | Coleman et al. | |
| 2008/0309998 A1 | 12/2008 | Nakamura | |
| 2009/0285528 A1 | 11/2009 | Chang et al. | |
| 2013/0038935 A1 | 2/2013 | Moussa et al. | |
| 2013/0250430 A1 | 9/2013 | Robbins et al. | |
| 2014/0010466 A1 | 4/2014 | Popovich et al. | |
| 2014/0104665 A1 | 4/2014 | Popovich et al. | |
| 2014/0014065 A1 | 5/2014 | Brown et al. | |
| 2014/0131586 A1 | 5/2014 | Wang et al. | |
| 2014/0140654 A1 | 5/2014 | Brown et al. | |
| 2014/0218801 A1 | 8/2014 | Simmonds et al. | |
| 2015/0255946 A1 | 9/2015 | Kitamura | |
| 2016/0104996 A1 | 4/2016 | Klennert | |
| 2016/0154150 A1 | 6/2016 | Simmonds et al. | |
| 2017/0031160 A1 | 2/2017 | Popovich et al. | |
| 2017/0059759 A1 | 3/2017 | Ayres et al. | |
| 2017/0276940 A1 | 9/2017 | Popovich et al. | |
| 2018/0081176 A1* | 3/2018 | Olkkonen .......... G02B 27/0172 |
| 2019/0094981 A1 | 3/2019 | Bradski et al. | |
| 2019/0361163 A1* | 11/2019 | Ayres ..................... G03H 1/041 |
| 2020/0064630 A1* | 2/2020 | Pfeiffer .................... G02B 5/32 |
| 2020/0117003 A1* | 4/2020 | Pfeiffer ................ G02B 6/4204 |
| 2020/0292745 A1* | 9/2020 | Waldern ............... G02B 6/0056 |
| 2021/0165224 A1* | 6/2021 | Utsugi ..................... G02B 5/32 |
| 2022/0082754 A1 | 3/2022 | Klug et al. | |

FOREIGN PATENT DOCUMENTS

| | | |
|---|---|---|
| CN | 103823267 A | 5/2014 |
| CN | 104035157 A | 9/2014 |
| CN | 104777535 A | 7/2015 |
| CN | 106707389 A | 5/2017 |
| JP | H11265139 A | 9/1999 |
| JP | 2003222727 A | 8/2003 |
| JP | 2006293358 A | 10/2006 |
| JP | 2007011057 A | 1/2007 |
| JP | 2007094175 A | 4/2007 |
| JP | 2008530613 A | 8/2008 |
| JP | 2012103495 A | 5/2012 |
| JP | 2013098087 A | 5/2013 |
| JP | 2015523586 A | 8/2015 |
| JP | 2016510931 A | 4/2016 |
| WO | 2005093493 A1 | 10/2005 |

OTHER PUBLICATIONS

Kress, Bernard C. et al, "Diffractive and Holographic Optics as Optical Combiners in Head Mounted Displays," UbiComp'13, 2013, pp. 1479-1482, Zurich, Switzerland, Sep. 8-12, 2013.

Cheng Dewen et al., "Design of an ultra-thin near-eye display with geometrical waveguide and freeform Optics," Optics Express, May 22, 2014, p. 20705, vol. 22, No. 17, DOI:10.I364/OE22.020705, Aug. 19, 2014.

Oliver Beyer et al., Holographic recording of Bragg gratings for wavelength division multiplexing in doped and partially polymerized poly (methyl methacrylate). Applied Optics, Jan. 1, 2003, pp. 30-37, vol. 42, No. 1., Optical Society of America, Washington, DC, United States. retrieved from Internet: <http://www.researchgate.net/publication/10958423_Holographic_Recording_of_Bragg_Gratings_for_Wavelength_Division_Multiplexing_in_Doped_and_Partially_Polymerized_Polymethyl_methacrylate>.

* cited by examiner

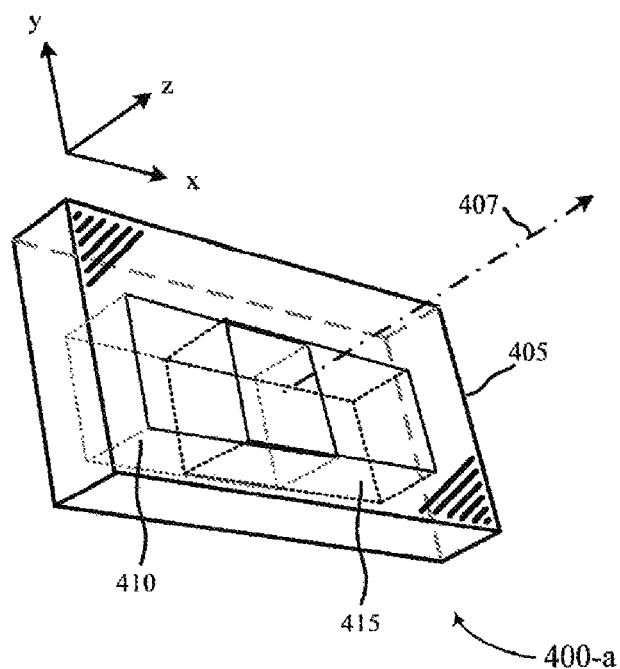
FIG. 4A
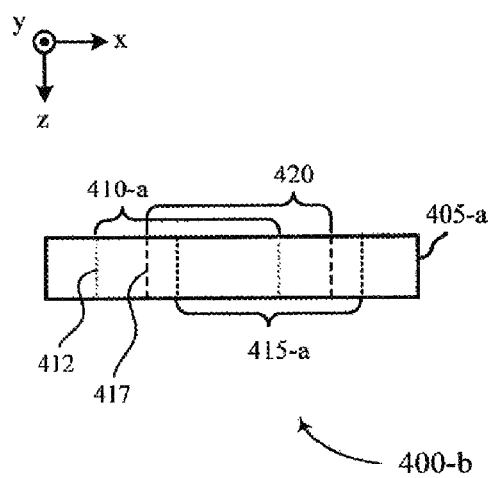 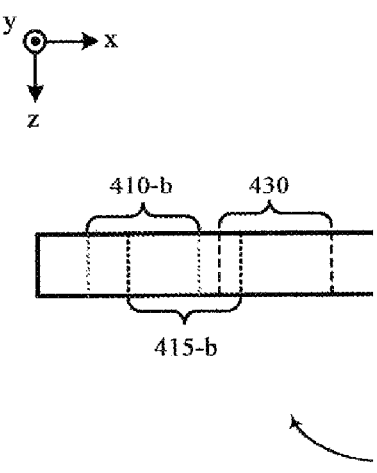
FIG. 4B  FIG. 4C

COMB-SHIFTED SKEW MIRRORS This application claims priority to U.S. provisional patent application No. 62/568,270, filed on Oct. 4, 2017, which is hereby incorporated by reference herein in its entirety.

BACKGROUND

Conventional dielectric mirrors are produced by coating a surface (typically glass) with layers of materials that differ from each other in their electric permittivity. The layers of materials are typically arranged so that Fresnel reflections from layer boundaries reinforce constructively, producing large net reflectivity. Broadband dielectric mirrors can be designed by ensuring that this condition obtains over a relatively broad specified range of wavelengths and incidence angles. However, because the layers are deposited on a surface, the reflective axis of a dielectric mirror is necessarily coincident with surface normal (i.e., the reflective axis is perpendicular to the mirror surface). Because of this constraint on the reflective axis, a dielectric mirror is disposed in some devices in a configuration that is suboptimal. Similarly, the reflective axis being constrained to surface normal makes a dielectric mirror entirely inadequate for some purposes. Moreover, glass dielectric mirrors tend to be relatively heavy, making them suboptimal or inappropriate for applications requiring a relatively lightweight reflective component.

Conversely, conventional grating structures can reflect light about a reflective axis that differs from surface normal of the medium in which the grating structure resides. However, for a given angle of incidence, angles of reflection for conventional grating structures typically co-vary with wavelength of incident light. Thus, using a conventional grating structure to reflect light avoids the constraint inherent in conventional mirrors that the reflective axis coincide with surface normal. However, where a substantially constant reflective axis is required, a conventional grating structure is substantially limited to a single wavelength (or very narrow range of wavelengths) for a given angle of incidence. Similarly, a conventional grating structure is limited to a single angle of incidence (or very narrow range of incidence angles), in order to reflect light of a specified wavelength about a constant reflective axis.

Accordingly, requirements for a relatively simple device that reflects light about a reflective axis not constrained to surface normal, and whose angle of reflection for a given angle of incidence is constant across a range of incidence angles, are not met by currently available reflective devices comprising either reflective grating structures or conventional mirrors. A need therefore exists for such a reflective device, and such need may be acute in head-mounted display devices.

SUMMARY

The described features generally relate to one or more improved methods, systems, or devices for diffracting light and optical diffractive devices comprising grating structures. The methods, systems, or devices may employ comb-shifted skew mirrors.

In some examples, an optical device may include a grating medium, a first set of holograms in a first region of the grating medium and a second set of holograms in a second region of the grating medium. Each of the holograms in the first set may at least partially overlap each of the other holograms in the first set. Each of the holograms in the first set may have a different respective grating frequency from a first set of grating frequencies. Each of the holograms in the second may at least partially overlap each of the other holograms in the second set. Each of the holograms in the second set may have a different respective grating frequency from a second set of grating frequencies. The second set of grating frequencies may be located within adjacent frequency gaps between the grating frequencies in the first set of grating frequencies.

In some examples, an optical system may perform pupil equalization using comb-shifted skew mirrors. For example, the optical system may include a grating medium having first and second regions, where the second region has first and second sub-regions. A first set of holograms may be formed in the first region, where the first set of holograms is configured to diffract a first portion of input light in a first direction and to pass a second portion of the input light to the second region. A second set of holograms may be formed in the first sub-region. A third set of holograms may be formed in the second sub-region. The second and third sets of holograms may be configured to diffract the second portion of the input light in a second direction that is different from the first direction. The third set of holograms may be comb-shifted with respect to the second set of holograms.

In some examples, a head-mounted display device may include first and second substrates and a grating medium between the first and second substrates. The grating medium may have first and second non-overlapping regions. Co-located first and second holograms may be formed in the first region. The first hologram may have a first grating frequency and the second hologram may have a second grating frequency that is separated from the first grating frequency by an adjacent frequency gap. Co-located third and fourth holograms may be formed in the second region. The third hologram may have a third grating frequency in the adjacent frequency gap.

BRIEF DESCRIPTION OF THE DRAWINGS

A further understanding of the nature and advantages of implementations of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4A is a perspective view of an illustrative optical structure that supports skew mirror pupil equalization in accordance with some embodiments.

FIGS. 4B and 4C are plan views of illustrative optical structures that support skew mirror pupil equalization in accordance with some embodiments.

DETAILED DESCRIPTION

Figure 1:
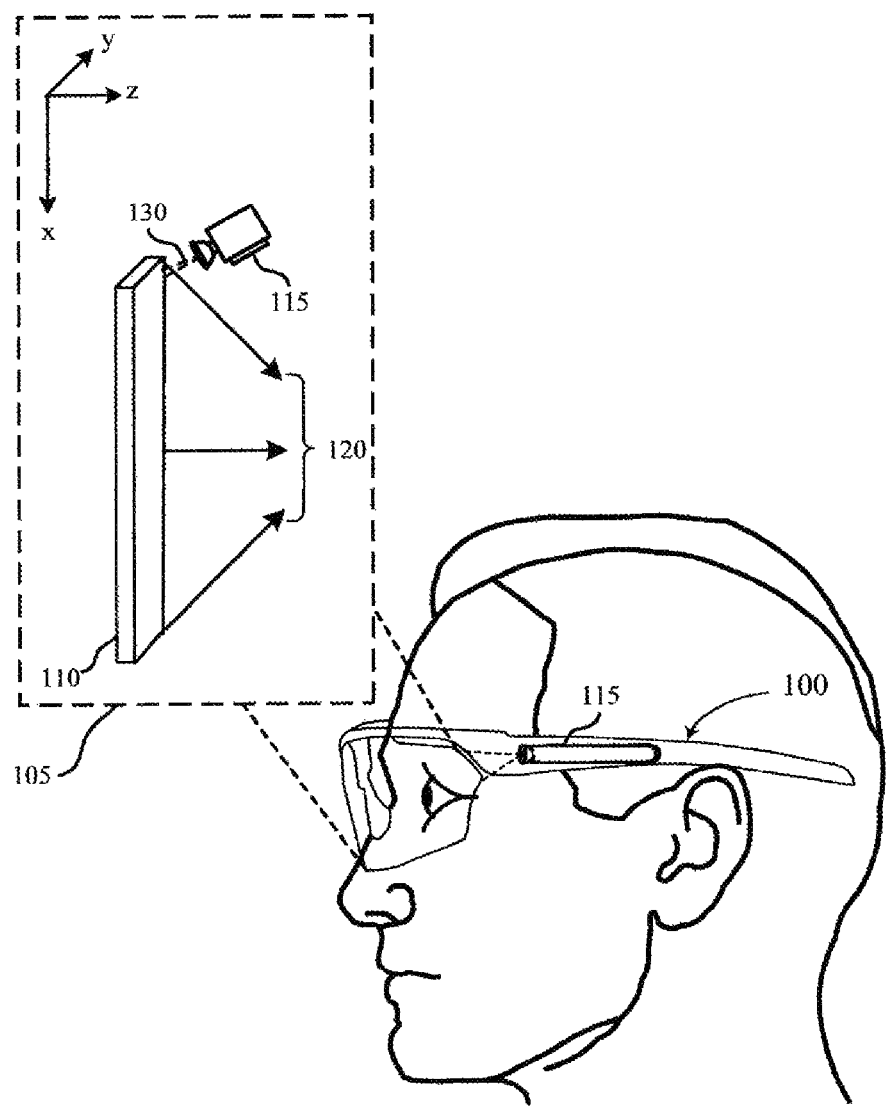
FIG. 1 is a diagram of an illustrative head mounted display (HMD) in which the principles included herein may be implemented in accordance with some embodiments.

An optical head-mounted display (HMD) is a wearable device that has the capability of reflecting projected images as well as allowing a user to experience augmented reality. Head-mounted displays typically involve near-eye optics to create "virtual" images. In the past HMDs have dealt with a variety of technical limitations that reduced image quality and increased weight and size. Past implementations have included conventional optics to reflect, refract or diffract light, however, the designs tend to be bulky. Additionally, conventional mirrors and grating structures have inherent limitations. For example, a conventional mirror may have a reflective axis that is necessarily coincident with surface normal. The reflective axis of a conventional mirror may lead to suboptimal orientation or performance of the mirror. Also, conventional grating structures may include multiple reflective axes that covary unacceptably with incidence angle and/or wavelength.

Accordingly, a device for reflecting light may include features that reflect light about a reflective axis not constrained to surface normal and whose angle of reflection for a given angle of incidence is constant at multiple wavelengths. Embodiments of the device may have substantially constant reflective axes (i.e., reflective axes that have reflective axis angles that vary by less than 1.0 degree) across a range of incidence angles for incident light of a given wavelength, and this phenomenon may be observed with incident light at various wavelengths. In some embodiments, the reflective axes remain substantially constant for every combination of a set of multiple incidence angles and a set of multiple wavelengths. Aspects of the disclosure are initially described in the context of an apparatus for reflecting light towards an eye box situated at a fixed distance away from a skew mirror. Specific examples are described for apparatus including a grating medium. The grating medium may include one or more grating structures. A grating structure may be configured to reflect light of a particular wavelength about a reflective axis offset from a surface normal of the grating medium at a particular plurality of incidence angles. Aspects of the disclosure are further illustrated by and described with reference to apparatus diagrams and system diagrams that relate to comb-shifted skew mirrors.

This description provides examples, and is not intended to limit the scope, applicability or configuration of implementations of the principles described herein. Rather, the ensuing description will provide those skilled in the art with an enabling description for implementing embodiments of the principles described herein. Various changes may be made in the function and arrangement of elements.

Thus, various implementations may omit, substitute, or add various procedures or components as appropriate. For instance, it should be appreciated that the methods may be performed in an order different than that described, and that various steps may be added, omitted or combined. Also, aspects and elements described with respect to certain implementations may be combined in various other implementations. It should also be appreciated that the following systems, methods, devices, and software may individually or collectively be components of a larger system, wherein other procedures may take precedence over or otherwise modify their application.

FIG. 1 is an illustration of a head mounted display (HMD) 100 in which the principles included herein may be implemented. The HMD 100 may include eyewear or headwear in which a near-eye display (NED) 105 may be affixed in front of a user's eyes. The NED 105 may include a diffractive element portion disposed within or incorporated with a lens assembly of the HMD 100. In some examples, the diffractive element portion is a holographic optical element (HOE), which may be comprised of a skew mirror 110. Coordinates (x, y, and z-axis) are provided with reference to the skew mirror 110. The HMD 100 may include a light source or light projector 115 operatively coupled to the lens assembly. In some examples light source or light projector 115 may be operatively coupled to the lens assembly in a waveguide configuration. In some examples light source or light projector 115 may be operatively coupled to the lens assembly in a free space configuration.

The skew mirror 110 is a reflective device which may include a grating medium within which resides a volume hologram or other grating structure. Skew mirror 110 may sometimes be referred to herein as volume holographic grating structure 110. The skew mirror 110 may include an additional layer such as a glass cover or glass substrate. The additional layer may serve to protect the grating medium from contamination, moisture, oxygen, reactive chemical species, damage, and the like. The additional layer may also be refractive index matched with the grating medium. The grating medium, by virtue of the grating structure residing therein, has physical properties that allow it to diffract light about an axis, referred to as a reflective axis, wherein angle of diffraction (henceforth referred to as angle of reflection) varies by less than 1° for multiple wavelengths of light incident upon the grating medium at a given angle of incidence. In some cases, the angle of diffraction is also constant for multiple wavelengths and/or angles of incidence. In some cases, the grating structure is formed by one or more holograms. The one or more holograms can be volume-phase holograms in some implementations. Other types of holograms may also be used in various implementations of the grating structure.

Similarly, implementations typically have substantially constant reflective axes (i.e., reflective axes have reflective axis angles that vary by less than 1°) across a range of incidence angles for incident light of a given wavelength, and this phenomenon may be observed with incident light at various wavelengths. In some implementations, the reflective axes remain substantially constant for every combination of a set of multiple incidence angles and a set of multiple wavelengths.

A hologram may be a recording of an interference pattern, and may include both intensity and phase information from the light used for the recording. This information may be recorded in a photosensitive medium that converts the interference pattern into an optical element that modifies the amplitude or the phase of subsequent incident light beams according to the intensity of the initial interference pattern. The grating medium may include a photopolymer, photorefractive crystals, dichromated gelatin, photo-thermo-refractive glass, film containing dispersed silver halide particles, or other material with the ability to react to and record an incident interference pattern. In some cases, coherent laser light may be used for recording and/or reading the recorded hologram.

In some cases, a hologram may be recorded using two laser beams known as recording beams. In some cases, the recording beams may be monochromatic collimated plane wave beams that are similar to each other except for angles at which they are incident upon the grating medium. In some implementations, the recording beams may have amplitude or phase distributions that differ from each other. The recording beams may be directed so that they intersect within the recording medium. Where the recording beams intersect, they interact with the recording medium in a way that varies according to the intensity of each point of the interference pattern. This creates a pattern of varying optical properties within the recording medium. For example, in some embodiments, a refractive index may vary within the recording medium. In some cases, the resulting interference pattern may be spatially distributed (e.g., with a mask or the like) in a manner that is uniform for all such grating structures recorded on the grating medium. In some cases, multiple grating structures may be superimposed within a single recording medium by varying the wavelength or the angle of incidence to create different interference patterns within the recording medium. In some cases, after one or more holograms are recorded in the medium, the medium may be treated with light in a post-recording light treatment. The post-recording light treatment may be performed with highly incoherent light to substantially consume remaining reactive medium components such as photoinitiator or photoactive monomer, such that photosensitivity of the recording medium is greatly reduced or eliminated. After recording of holograms or other grating structures in a recording medium has been completed, the medium is typically referred to as a grating medium. Grating mediums have typically been rendered non-photosensitive.

In some implementations, the grating structure includes a hologram generated by interference between multiple light beams referred to as recording beams. Typically, but not necessarily, the grating structure includes multiple holograms. The multiple holograms may be recorded using recording beams incident upon the grating medium at angles that vary among the multiple holograms (i.e., angle multiplexed), and/or using recording beams whose wavelengths vary among the multiple holograms (i.e., wavelength multiplexed). In some implementations, the grating structure includes a hologram recorded using two recording beams whose angles of incidence upon the grating medium vary while the hologram is being recorded, and/or whose wavelengths vary while the hologram is being recorded. Implementations further include a device wherein the reflective axis differs from surface normal of the grating medium by at least 1.0 degree; or at least by 2.0 degrees; or at least by 4.0 degrees; or at least by 9.0 degrees.

Light projector 115 may provide image-bearing light to the lens assembly. In some examples, the lens assembly and skew mirror 110 may be substantially flat with respect to the x-y plane; however, the lens assembly may include some curvature with respect to the x-y plane in certain implementations. Reflected light 120 from skew mirror 110 may be reflected towards an eye box situated at a fixed distance along the z-axis away from skew mirror 110. In some examples, skew mirror 110 may be contained at least partially within a waveguide. The waveguide may propagate incident light 130 by total internal reflection towards the skew mirror 110. In some examples, incident light 130 may propagate by free space towards skew mirror 110. The skew mirror 110 may include a grating medium made of a photopolymer. The skew mirror 110 may also include one or more grating structures within the grating medium. Each grating structure may include one or more sinusoidal volume gratings which may overlap with each other. A grating structure may be configured to reflect light of a particular wavelength about a reflective axis offset from a surface normal of the grating medium at a particular plurality of incidence angles. Each grating structure within the grating medium may be configured to reflect a portion of light toward an exit pupil in the eye box at a fixed distance from the waveguide.

Each grating structure may reflect light in a manner different from another grating structure. For example, a first grating structure may reflect incident light of a first wavelength at a first incidence angle, whereas a second grating structure may reflect incident light of a second wavelength at the first incidence angle (e.g., different grating structures may be configured to reflect different wavelengths of light for incident light of the same incidence angle). Also, a first grating structure may reflect incident light of a first wavelength at a first incidence angle, whereas a second grating structure may reflect incident light of the first wavelength at a second incidence angle (e.g., different grating structures may be configured to reflect the same wavelength of light for incident light of different incidence angles). Furthermore, a grating structure may reflect first incident light of a first wavelength and first incidence angle, and the grating structure may reflect second incident light at a second wavelength and second incidence angle about the same reflective axis. In this manner, different grating structures can be used to selectively reflect a particular wavelength of light for incident light at a given incidence angle. These different grating structures may be superimposed within the grating medium of the skew mirror 110. The skew mirror 110 may have a substantially constant reflective axis (e.g., each grating structure of the skew mirror 110 has substantially the same reflective axis).

In some examples, a head mounted display device may comprise a light source or light projector 115 for providing image-bearing light and a lens assembly. The lens assembly may include skew mirror 110. The lens assembly may comprise a light input section for receiving the image-bearing light from the light source or light projector 115. A waveguide may be disposed within the lens assembly and be operatively coupled to the light input section. The waveguide may comprise at least two substrates (not shown), a grating medium disposed between the at least two substrates, a first grating structure within the grating medium, and a second grating structure within the grating medium. In some examples, the waveguide may be omitted and the light source or light projector 115 may be operatively coupled to the lens assembly in a free space configuration. The first grating structure may be configured to reflect light of a wavelength about a first reflective axis of the first grating structure offset from a surface normal of the grating medium. The first grating structure may be configured to reflect light at a first incidence angle. The second grating structure may be configured to be at least partially non-overlapping with the first grating structure. The second grating structure may be configured to reflect light of the same wavelength as light reflected by the first grating structure. The second grating structure may be configured to reflect light of the wavelength about a second reflective axis of the second grating structure offset from the surface normal of the grating medium. The second grating structure may be configured to reflect light at a second incidence angle different from the first incidence angle.

Figure 2A:
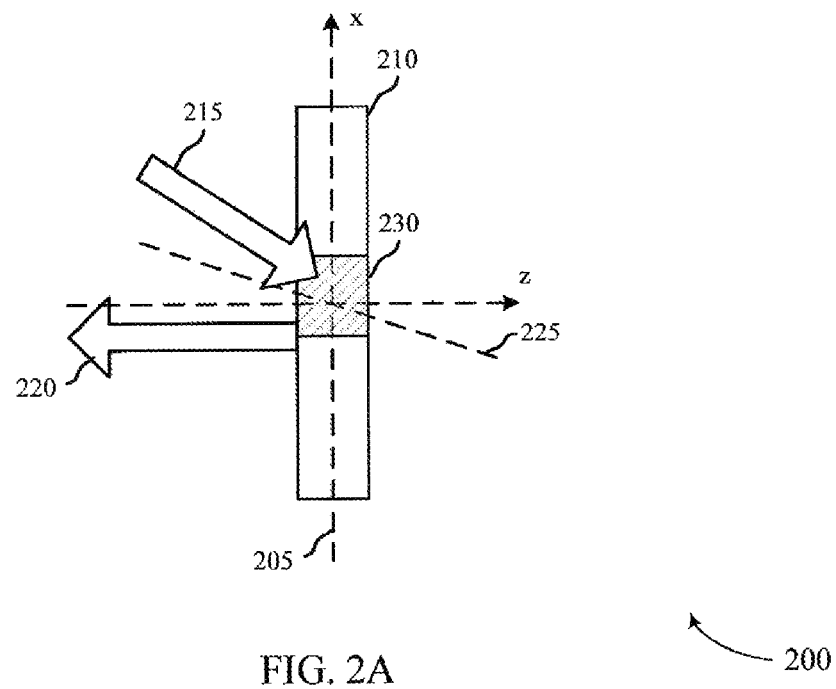
FIG. 2A is a diagram illustrating reflective properties of an illustrative skew mirror in real space in accordance with some embodiments.

FIG. 2A is a cross-section view 200 illustrating reflective properties of a skew mirror 210 in real space according to one example. The cross-section view 200 may include a grating structure such as hologram 230 in a grating medium. FIG. 2A omits skew mirror components other than the grating medium, such as an additional layer that might serve as a substrate or protective layer for the grating medium. The substrate or protective layer may serve to protect the grating medium from contamination, moisture, oxygen, reactive chemical species, damage, and the like. Implementations of a skew mirror for pupil equalization may be partially reflective. In this manner, a skew mirror for pupil equalization may be configured to selectively reflect the rays of light where they are needed to form an exit pupil towards an eye box. The skew mirror for pupil equalization may be configured to avoid reflecting the rays of light for certain incidence angles where such a reflection would reflect the rays of light to an area that is not toward the desired exit pupil. Implementations of some skew mirror embodiments may require relatively high dynamic range recording medium to achieve high reflectivity over a relatively wide wavelength bandwidth and angle range for the resulting grating medium. By contrast, a skew mirror for pupil equalization may require less dynamic range thereby allowing each hologram to be stronger (e.g., recorded with a greater intensity and/or longer exposure time). A skew mirror composed of stronger holograms may provide a brighter image, or allow a dimmer light projector to provide an image of equal brightness.

The skew mirror 210 is characterized by the reflective axis 225 at an angle measured with respect to the z-axis. The z-axis is normal to the skew mirror axis 205. The skew mirror 210 is illuminated with the incident light 215 with an internal incidence angle that is measured with respect to the z-axis. The principal reflected light 220 may be reflected with internal reflection angle axis substantially normal to the surface of skew mirror 210. In some examples, the principal reflected light 220 may correspond to wavelengths of light residing in the red, green, and blue regions of the visible spectrum. For example, the red, green, and blue regions of the visible spectrum may include a red wavelength (e.g., 610-780 nm) band, green wavelength (e.g., 493-577 nm) band, and blue wavelength (e.g., 405-492 nm) band. In other examples, the principal reflected light 220 may correspond to wavelengths of light residing outside of the visible spectrum (e.g., infrared and ultraviolet wavelengths).

The skew mirror 210 may have multiple hologram regions which all share substantially the same reflective axis 225. These multiple regions, however, may each reflect light for different ranges of angles of incidence. For example, the bottom third of a HOE containing the skew mirror 210 may only contain that subset of grating structures that reflects light upwards towards a corresponding eye box. The middle third may then reflect light directly towards the corresponding eye box. Then the top third need only contain the subset of grating structures which reflects light downwards to the corresponding eye box.

Figure 2B:
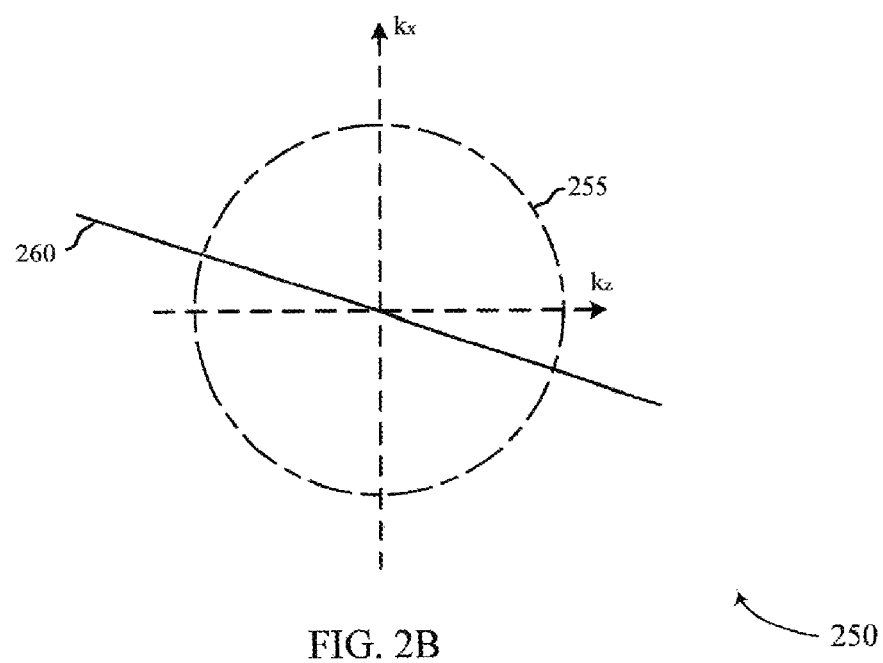
FIG. 2B illustrates an illustrative skew mirror in k-space in accordance with some embodiments.

FIG. 2B illustrates a k-space representation 250 of the skew mirror 210 of FIG. 2A. The k-space distributions of spatially varying refractive index components are typically denoted $\Delta n(\vec{k})$. $\Delta n(\vec{k})$ k-space distribution 260 passes through the origin, and has an angle measured with respect to the z-axis, equal to that of the reflective axis 225. Recording k-sphere 255 is the k-sphere corresponding to a particular writing wavelength. K-space 250 may include various k-spheres corresponding to wavelengths of light residing in the red, green, and blue regions of the visible spectrum.

The k-space formalism is a method for analyzing holographic recording and diffraction. In k-space, propagating optical waves and holograms are represented by three dimensional Fourier transforms of their distributions in real space. For example, an infinite collimated monochromatic reference beam can be represented in real space and k-space by equation (1):

$$E_r(\vec{r}) = A_r\exp(i\vec{k}_r \cdot \vec{r}) \xrightarrow{\mathfrak{F}} E_r(\vec{k}) = A_r\delta(\vec{k} - \vec{k}_r), \quad (1)$$

where $E_r(\vec{r})$ is the optical scalar field distribution at all $\vec{r} = \{x,y,z\}$ 3D spatial vector locations, and its transform $E_r(\vec{k})$ is the optical scalar field distribution at all $\vec{k} = \{k_x, k_y, k_z\}$ 3D spatial frequency vectors. $A_r$ is the scalar complex amplitude of the field; and $\vec{k}_r$ is the wave vector, whose length indicates the spatial frequency of the light waves, and whose direction indicates the direction of propagation. In some implementations, all beams are composed of light of the same wavelength, so all optical wave vectors must have the same length, i.e., $|\vec{k}| = k_n$. Thus, all optical propagation vectors must lie on a sphere of radius $k_n = 2\pi n_0/\lambda$, where no is the average refractive index of the hologram ("bulk index"), and 2 is the vacuum wavelength of the light. This construct is known as the k-sphere. In other implementations, light of multiple wavelengths may be decomposed into a superposition of wave vectors of differing lengths, lying on different k-spheres.

Another important k-space distribution is that of the holograms themselves. Volume holograms usually consist of spatial variations of the index of refraction within a grating medium. The index of refraction spatial variations, typically denoted $\Delta n(\vec{r})$, can be referred to as index modulation patterns, the k-space distributions of which are typically denoted $\Delta n(\vec{k})$. The index modulation pattern created by interference between a first recording beam and a second recording beam is typically proportional to the spatial intensity of the recording interference pattern, as shown in equation (2):

$$\Delta n(\vec{r}) \propto |E_1(\vec{r}) + E_2(\vec{r})|^2 = |E_1(\vec{r})|^2 + |E_2(\vec{r})|^2 + E_1^*(\vec{r})E_2(\vec{r}) + E_1(\vec{r})E_2^*(\vec{r}), \quad (2)$$

where $E_1(\vec{r})$ is the spatial distribution of the first recording beam field and $E_2(\vec{r})$ is the spatial distribution of the second recording beam field. The unary operator "*" denotes complex conjugation. The final term in equation (2), $E_1(\vec{r})E_2^*(\vec{r})$, maps the incident second recording beam into the diffracted first recording beam. Thus the following equation may result:

$$E_1(\vec{r})E_2^*(\vec{r}) \xrightarrow{\mathcal{F}} E_1(\vec{k}) \otimes E_2(\vec{k}), \quad (3)$$

where $\otimes$ is the 3D cross correlation operator. This is to say, the product of one optical field and the complex conjugate of another in the spatial domain becomes a cross correlation of their respective Fourier transforms in the frequency domain.

Typically, the hologram 230 constitutes a refractive index distribution that is real-valued in real space. Locations of $\Delta n(\vec{k})$ k-space distributions of the hologram 230 may be determined mathematically from the cross-correlation operations $E_2(\vec{k}) \otimes E_1(\vec{k})$ and $E_1(\vec{k}) \otimes E_2(\vec{k})$, respectively, or geometrically from vector differences $\vec{k}_{G+} = \vec{k}_1 - \vec{k}_2$ and $\vec{k}_{G-} = \vec{k}_2 - \vec{k}_1$ where $\vec{k}_{G+}$ and $\vec{k}_{G-}$ are grating vectors from the respective hologram $\Delta n(\vec{k})$ k-space distributions to the origin (not shown individually). Note that by convention, wave vectors are represented by a lowercase "k," and grating vectors by uppercase "K."

Once recorded, the hologram 230 may be illuminated by a probe beam to produce a diffracted beam. For purposes of the present disclosure, the diffracted beam can be considered a reflection of the probe beam, which can be referred to as an incident light beam (e.g., image-bearing light). The probe beam and its reflected beam are angularly bisected by the reflective axis 225 (i.e., the angle of incidence of the probe beam relative to the reflective axis has the same magnitude as the angle of reflection of the reflected beam relative to the reflective axis). The diffraction process can be represented by a set of mathematical and geometric operations in k-space similar to those of the recording process. In the weak diffraction limit, the diffracted light distribution of the diffracted beam is given by equation (4), $$E_d(\vec{k}) \propto \Delta n(\vec{k}) * E_p(\vec{k}) * E_p(\vec{k})|_{|\vec{k}|=k_n}, \quad (4)$$

where $E_d(\vec{k})$ and $E_p(\vec{k})$ are k-space distributions of the diffracted beam and the probe beam, respectively; and "*" is the 3D convolution operator. The notation "$|_{|\vec{k}|=k_n}$" indicates that the preceding expression is evaluated only where $|\vec{k}|=k_n$, i.e., where the result lies on the k-sphere. The convolution $\Delta n(\vec{k}) * E_p(\vec{k})$ represents a polarization density distribution, and is proportional to the macroscopic sum of the inhomogeneous electric dipole moments of the grating medium induced by the probe beam, $E_p(\vec{k})$.

Typically, when the probe beam resembles one of the recording beams used for recording, the effect of the convolution is to reverse the cross correlation during recording, and the diffracted beam will substantially resemble the other recording beam used to record a hologram. When the probe beam has a different k-space distribution than the recording beams used for recording, the hologram may produce a diffracted beam that is substantially different than the beams used to record the hologram. Note also that while the recording beams are typically mutually coherent, the probe beam (and diffracted beam) is not so constrained. A multi-wavelength probe beam may be analyzed as a superposition of single-wavelength beams, each obeying Equation (4) with a different k-sphere radius.

The term probe beam, typically used herein when describing skew mirror properties in k-space, is analogous to the term incident light, which is typically used herein when describing skew mirror reflective properties in real space. Similarly, the term diffracted beam, typically used here when describing skew mirror properties in k-space, is analogous to the term principal reflected light, typically used here when describing skew mirror properties in real space. Thus when describing reflective properties of a skew mirror in real space, it is typical to state that incident light is reflected by a hologram (or other grating structure) as principal reflected light, though to state that a probe beam is diffracted by the hologram to produce a diffracted beam says essentially the same thing. Similarly, when describing reflective properties of a skew mirror in k-space, it is typical to state that a probe beam is diffracted by a hologram (or other grating structure) to produce a diffracted beam, though to state that incident light is reflected by the grating structure to produce principal reflected light has the same meaning in the context of implementations of the present disclosure.

Figure 3A:
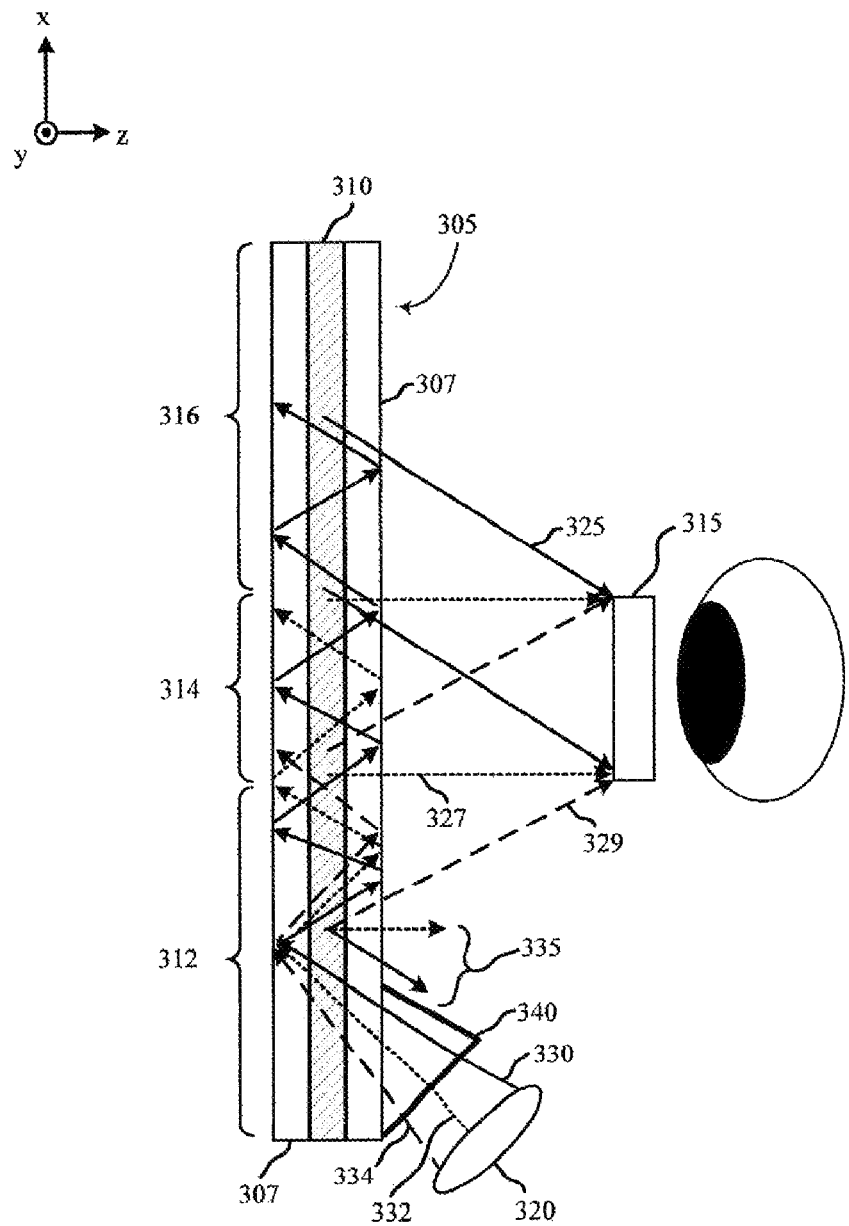
FIG. 3A is a diagram of an illustrative optical system incorporating skew mirror exit pupil equalization in accordance with some embodiments.

FIG. 3A illustrates a diagram of an optical system 300-*a* incorporating skew mirror exit pupil equalization. Optical system 300-*a* may be utilized in an HMD, augmented reality (AR), mixed reality (MR), or virtual reality (VR) application such as, but not limited to, the HMD 100 of FIG. 1. Optical system 300-*a* may also be utilized in various optical coupling applications such as, but not limited to, large screen display and optical sensor applications. The optical system 300-*a* may employ selective coupling to allow a skew mirror 305 to diffract light towards a specific location, such as an eye box 315, thereby improving photometric efficiency (e.g., image brightness). This may have an advantageous effect of producing an exit pupil at the eye box 315. The exit pupil may be a fixed distance from the skew mirror 305. An exit pupil may increase optical efficiency relative to an internal exit pupil. The represented angles are internal angles relative to the surface normal of the grating medium, and that refraction at the grating medium and/or the substrate interface, as well as at the substrate air interface, is ignored for the purpose of illustration. Optical system 300-*a* is viewed from an overhead perspective and could represent either the left or right eye of the user. For ease of description, optical system 300-*a* will be described from the left eye perspective of the user.

The skew mirror 305 and the grating medium 310 may both be located at least partially within a waveguide. Grating medium 310 may be at least partially or wholly enclosed by substrates 307 (e.g., glass covers or like protective layers). The skew mirror 305 may contain one or more grating structures within the grating medium 310. A grating structure is an optical device that may reflect, diffract, and/or split incident light into beams or waves that may then continue propagating in different directions. A grating may be characterized by its diffracted angle response. For a sinusoidal grating, the diffracted angle response may be expressed by:

$$\Delta\theta_r \cos\theta_r = -\Delta\theta_i \cos\theta_i \quad (5)$$

The diffracted angle response expresses the change in the angle of reflection, $\Delta\theta_r$, in response to small changes in the angle of incidence, $\Delta\theta_i$. In contrast, a true mirror has an angle response expressed by:

$$\Delta\theta_r = -\Delta\theta_i \quad (6)$$

The angles in equation (5) and (6) are in k-space relative to the kz-axis.

A device substantially characterized by diffracted angle response may be said to exhibit grating-like reflective behavior, whereas a device substantially characterized by the true mirror angle response may be said to exhibit mirror-like reflective behavior. A device exhibiting grating-like reflective behavior will also exhibit a reflective axis that changes with angle of incidence, unless that reflective axis is normal to the device surface, in which case $\cos\theta_r = \cos\theta_i$. Accordingly, requirements for a relatively simple device that reflects light about a reflective axis not constrained to surface normal, and whose angle of reflection for angles of incidence spanning multiples of its angular Bragg selectivity is constant at wavelengths spanning multiples of its wavelength Bragg selectivity, may not be met by a single sinusoidal grating. As is known to those skilled in the art, a device that reflects light (e.g., a sinusoidal grating) may exhibit both angular and wavelength Bragg selectivity.

The grating medium 310 may be comprised of a photopolymer, photorefractive crystals, dichromated gelatin, photo-thermo-refractive glass, film containing dispersed silver halide particles, or other material with the ability to react to and record an incident interference pattern. The grating structures may be comprised of holograms, such as but not limited to, volume-phase holograms. Multiple holograms may be recorded into the grating medium internal volume and may thus extend below the grating medium surface. Accordingly, these holograms are sometimes referred to as volume holograms. In some implementations, each of the multiple holograms at least partially spatially overlaps at least one, but not all, of the other of the multiple holograms. In some examples, each of the multiple holograms at least partially spatially overlaps all of the other holograms. In some embodiments, some of the multiple holograms may not spatially overlap some of the other holograms.

For example, spatially overlapping holograms overlap with respect to the space occupied or volume shared by two holograms in a contiguous grating medium (e.g., two spatially overlapping holograms share or coexist in at least a portion of the same space or volume within the grating medium 310). In this manner, at least some of the varying refractive index properties and associated fringe patterns of a first hologram will occupy the same space or volume of (and be superimposed or intermingled with) at least some of the varying refractive index properties and associated fringe patterns of a second hologram within the grating medium 310. In examples where holograms do not spatially overlap, the two holograms do not intersect or overlap in any manner within a contiguous grating medium. For example, a first hologram may be disposed on a volumetric portion of the grating medium 310 spaced apart from a second hologram. In some embodiments, a skew mirror may include both spatially overlapping and spatially non-overlapping holograms within the grating medium 310.

Each grating structure within the grating medium 310 may be configured to reflect light about a reflective axis of the skew mirror 305. The reflective axis may be an example of the reflective axis 225 depicted in FIG. 2A. The reflective axis may be offset from a surface normal of the grating medium. Incident light and its reflection are bisected by the reflective axis such that the internal angle of incidence of the incident light relative to the reflective axis has the same magnitude as the internal angle of reflection of the reflected light relative to the reflective axis. That is, the incident light and its reflection may exhibit bilateral symmetry about the reflective axis. In some implementations, a grating structure may be configured to reflect light at a reflection angle that is between the plurality of incidence angles and the surface normal of the grating medium.

Each grating structure within the grating medium 310 may be configured to reflect light of one or more wavelengths at a particular plurality of incidence angles (the one or more wavelengths may include at least one visible red light wavelength, one visible blue light wavelength, and one visible green light wavelength). Each grating structure within the grating medium 310 may reflect light at a plurality of incidence angles that are different from a plurality of incidence angles corresponding to a different grating structure. Each grating structure within the grating medium 310 may be comprised of a plurality of sinusoidal volume gratings.

Optical system 300-a illustrates a light source or light projector 320 (e.g., microdisplay illuminated by a light-emitting diode). The light may enter the skew mirror 305 through an input coupler 340. The input coupler 340 may be a prism or prism-like structure, a grating structure, a mirror or reflective structure, an edge facet or curved surface, or other input coupling techniques. The refractive index of the input coupler 340 may be index matched with a substrate 307 to which the input coupler 340 is coupled. In some examples, however, an input coupler may not be used to direct light (e.g., image-bearing light) to a skew mirror. The light may include a range of visible light (e.g., visible red light, visible blue light, and visible green light). For reflected light ray 325 to be reflected towards the eye box 315, incident light 330 must propagate by total internal reflection toward a third (e.g., right) region 316 of the grating medium 310. However, incident light 330 must pass through a first (e.g., left) region 312 and second (e.g., middle) region 314 of the grating medium 310 in order to reach the third region 316 of the grating medium 310. If, for example, a conventional grating structure were utilized in the grating medium 310, some light entering the waveguide would likely be misdirected (e.g., out-coupled as the light propagated), producing the wasted light 335 that does not reach the eye box 315. In optical system 300-a, however, at least some holograms that Bragg-match the light of the reflected light ray 325 (e.g., light of each wavelength of visible light of the reflected light ray 325) are not written in the first region 312 and second region 314 of the skew mirror 305, allowing the light to propagate undiminished to the first region 312 by selective coupling (e.g., by not writing holograms in the grating medium 310 that will reflect the light of reflected light ray 325 toward an area other than the eye box 315). In some examples, however, some wasted light may be produced even by a skew mirror employing selective coupling, for example, if a grating in the first region intended to direct blue light upwards towards the eye box also directs green rightwards that misses the eye box. Embodiments of optical system 300-a improve on unequalized cases of reflecting light because skew mirror 305 is configured to reflecting light toward the eye box 315.

In some cases, a volume holographic grating may include holographic structures that are Bragg matched for combinations of angles and wavelengths that differ from each other. That is, within the grating medium, wavelengths of light that differ from each other are reflected along a same reflective axis based on holographic grating structures that differ from each other. Holograms corresponding to reflected light rays similarly situated with respect to the regions of the grating medium 310 as reflected light ray 325 may likewise be omitted or included such that the reflected light rays are incident on the eye box 315, but not other areas (e.g., areas longitudinally adjacent to eye box 315 along the x-axis).

Therefore, according to examples of the present disclosure, incident light 330 may be selectively reflected by a hologram that is at least partially disposed in the third region 316 of the grating medium 310 and will cause incident light 330 to be reflected as reflected light ray 325 toward eye box 315. That is, incident light 330 may be selectively reflected in the third region 316 for light rays having an angle of incidence corresponding to incident light 330. Similarly, incident light 332 may be selectively reflected by a hologram that is at least partially disposed in the second region 314 of the grating medium 310 and will cause incident light 332 to be reflected as reflected light ray 327 toward eye box 315. That is, incident light 332 may be selectively reflected in the second region 314 for light rays having an angle of incidence corresponding to incident light 332. In some examples, incident light 334 may be selectively reflected by a hologram that is at least partially disposed in the first region 312 of the grating medium 310 and will cause incident light 334 to be reflected as reflected light ray 329 toward eye box 315. That is, incident light 334 may be selectively reflected in the first region 312 for light having an angle of incidence corresponding to incident light 334.

Optical system 300-a is illustrated as reflecting light at a plane residing approximately at the center of the grating medium 310. However, persons skilled in the art recognize that light is typically reflected throughout the grating structure rather than at a specific plane. Additionally, for each reflected light ray intended to be directed to the eye box 315, one or more holograms in one or more grating structures of the grating medium 310 may be written for various wavelengths of visible red light, various wavelengths of visible blue light, and various wavelengths of visible green light.

In accordance with aspects of optical system 300-a, exit pupil equalization with skew mirror 305 and variations thereof may reduce the grating medium dynamic range required to achieve a desired level of performance, or increase the diffraction efficiency obtainable. Light reflected from skew mirror 305 may be desired only at eye box 315 (or another specific location in accordance with various implementations). The spatial distribution of the line segment-like k-space index distribution may be reduced so as to produce reflection only or mostly towards the eye box 315. In some examples, the irradiance profile upon the grating medium 310 to write a hologram during a single recording exposure may be substantially described by $$I(x) \propto rect\left[\frac{1}{d_{EB}}(x - d_{ER}\tan\theta_S)\right], \quad (7)$$

where $d_{EB}$ is the size of the eye box 315 and $d_{ER}$ is the distance from the eye box 315 to the hologram and grating structure within the grating medium 310, and θs is the angle the reflected beam makes with the z-axis. Therefore, in some examples, forming a grating structure within grating medium 310 may be based at least in part on a size (e.g., a length or width) of the eye box 315. In some examples, forming a grating structure within grating medium 310 may be based at least in part on a distance from the eye box 315 to the grating structure.

Figure 3B:
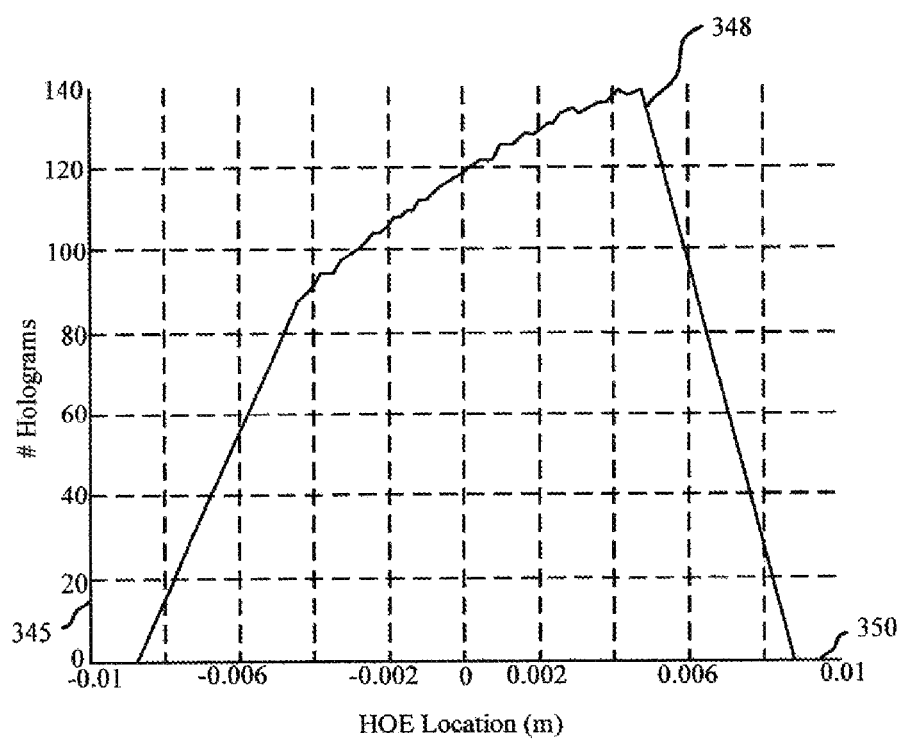
FIG. 3B is an illustrative plot that supports skew mirror pupil equalization in accordance with some embodiments.

FIG. 3B is a plot that supports skew mirror pupil equalization in accordance with aspects of the present disclosure. Plot 300-b includes number of holograms on axis 345 and location of HOE (i.e., eye relief) on axis 350. Plot line 348 of plot 300-b illustrates an example of a reduction in maximum hologram multiplexing density for a 200 μm thick skew mirror coupler with a 30° field of view. Plot line 348 of plot 300-b also illustrates the total number of overlapping holograms that may be required at each longitudinal location along the HOE. As described herein, an equivalent number of holograms (e.g., according to the full width at quarter maximum (FWQM) rule), which may need to be recorded in a region of maximum hologram multiplexing density, may be reduced by a significant factor.

A successive hologram may be spaced or offset from a neighboring or adjacent hologram. Plot line 348 of plot 300-b illustrates the results in this spaced or offset distribution of successive holograms. The gratings extend all the way across the medium (from −13 mm to +13 mm) along the y-axis, and are spaced apart (e.g., staggered) along the x-axis, each offset from its neighbor by a distance. The distance can be constant (e.g., 0.10 mm) and/or variable throughout one or more regions. As can be observed from plot line 348, a total number of overlapping holograms required at each longitudinal location along the grating medium 310 may be reduced by approximately 83% at 8 mm away from (e.g., below) the center of the grating medium 310 and by approximately 25% at 4 mm away from (e.g., below) the center of the grating medium 310 (e.g., a reduction in the total number of overlapping holograms in the first region 312 of the grating medium 310). Similarly, a total number of overlapping holograms required at each longitudinal location along the grating medium 310 may be reduced by approximately 75% at 8 mm away from (e.g., above) the center of the grating medium 310 and by approximately 17% at 6 mm away from (e.g., above) the center of the grating medium 310 (e.g., a reduction in the total number of overlapping holograms in the third region 316 of the grating medium 310). In this non-limiting example, skew mirror 305 may be equalized to produce a $d_{EB}$=4 mm eye box at a distance of $d_{ER}$=25 mm, and without exit pupil equalization, such a skew mirror device would require the multiplexing of 325 holograms everywhere along the 17.5 mm length of the skew mirror device. Using exit pupil equalization techniques described herein, the maximum hologram multiplexing density may be decreased to 139 holograms. This reduction represents only 42.8% of the unequalized density, potentially resulting in a 5.47× improvement in diffraction efficiency given the same recording material for the grating medium 310.

Additionally, it is to be understood that more than the three regions of the grating medium 310 may be employed in various embodiments. In some examples, a separate region may be employed for each hologram (or a grating structure having a set of similar holograms). In some examples, exit pupil equalization techniques as described herein may be applied for multiple color bands, producing, for example, three separate skew mirror grating frequency bands corresponding to a red wavelength (e.g., 610-780 nm) band, green wavelength (e.g., 493-577 nm) band, and blue wavelength (405-492 nm) band. Skew mirror equalization may be performed in two dimensions if desired (e.g., using a cross coupler, an output coupler, duct-type waveguides, slab-type waveguides, etc.).

FIG. 4A is a perspective view of an optical structure 400-*a* that supports skew mirror pupil equalization in accordance with various aspects of the present disclosure. Optical structure 400-*a* may include aspects a skew mirror 110 of the HMD 100 in FIG. 1, skew mirror 210 in FIG. 2A, and/or skew mirror 305 in FIG. 3. Optical structure 400-*a* may include a grating medium 405, a first grating structure 410, and a second grating structure 415.

The optical structure 400-*a* may employ selective coupling to form an external exit pupil (not shown) where all or most reflected light is directed. The diffraction efficiency and the photometric efficiency of a system may be increased by incorporating the optical structure 400-*a* comprising skew mirror exit pupil equalization techniques. Optical structure 400-*a* may be substantially clear such that grating structures using one or more holograms within the grating medium 405 are invisible (or nearly invisible) to the eye. In an application, such as a head mounted display, light may be diffracted from a skew mirror towards a specific location, such as an eye box (not shown) that may generally align with the external exit pupil.

The first grating structure 410 and the second grating structure 415 may each be configured to reflect light of a particular wavelength about a reflective axis offset from a surface normal of the grating medium at a plurality of incidence angles. In some examples, each of the first and second grating structures may include a plurality of holograms that form the grating structures. For ease of understanding, each of the first grating structure 410 and the second grating structure 415 is generally discussed as a single hologram. Embodiments of optical structure 400-*a*, however, are not limited to such single hologram grating structures.

The first grating structure 410 within the grating medium 405 may be configured to reflect light of a wavelength about a first reflective axis offset from a surface normal 407 of the grating medium at a first incidence angle. The second grating structure 415 within the grating medium 405 may be disposed so that the second grating structure 415 is at least partially non-overlapping with the first grating structure 410. The second grating structure 415 may be configured to reflect light of the wavelength about a second reflective axis offset from the surface normal 407 of the grating medium 405 at a second incidence angle different from the first incidence angle. The first grating structure 410 and the second grating structure 415 may each comprise a hologram or a sinusoidal volume grating. In some embodiments, either holograms or non-holography sinusoidal volume gratings are used in the grating medium 405 of optical structure 400-*a*. In other embodiments, both holograms and non-holography sinusoidal volume gratings may be used in the same grating medium 405.

The first grating structure 410 may be partially spatially overlapping with the second grating structure 415 such that the optical characteristics (e.g., varying refractive index properties and associated fringe patterns) of the first grating structure 410 and the second grating structure 415 are superimposed or intermingled. In some examples, the first reflective axis is substantially parallel to the second reflective axis. In some examples, the first incidence angle and the second incidence angle differ by at least 5°.

In one example, the first grating structure 410 is further configured to reflect light of the wavelength about the first reflective axis offset from the surface normal 407 of the grating medium 405 at a first range of incidence angles. This first range of incidence angles can include the first incidence angle discussed above. Each incidence angle of the first range of incidence angles may be greater than the second incidence angle. Additionally, incidence angle of the first range of incidence angles may correspond to a respective hologram (e.g., the first grating structure 410 comprises a plurality of holograms in this example). The first grating structure 410 may comprise at least three holograms (e.g., for reflecting light of the same wavelength). Each of the at least three holograms may correspond to a unique incidence angle within the first range of incidence angles. An adjacent $|\Delta K_G|$ for the at least three holograms may have a mean value that resides between $1.0 \times 10^4$ and $1.0 \times 10^6$ radians per meter (rad/m). It is to be understood that the at least three angles are described in this example to illustrate the $|\Delta K_G|$ relationship of adjacent holograms in a grating structure, and many holograms corresponding to many unique incidence angles may be included in first grating structure 410 and other grating structures within the grating medium 405.

The first grating structure 410 and the second grating structure 415 are describe as reflecting a wavelength of light (e.g., a visible red light wavelength, a visible blue light wavelength, or a visible green light wavelength), and therefore optical device 400-*a* may be described in a monochromatic sense, but example of optical device 400-*a* generally include grating structures configured to reflect multiple wavelengths of light. For example, the first grating structure 410 may be further configured to reflect light of a plurality of wavelengths at the first incidence angle and the second grating structure 415 may be further configured to reflect light of the plurality of wavelengths at the second incidence angle. In some embodiments, the plurality of wavelengths includes a visible red light wavelength (e.g., 618 nm), a visible blue light wavelength (e.g., 460 nm), and a visible green light wavelength (e.g., 518 nm). In other embodiments, the plurality of wavelengths includes two or more visible red light wavelengths from a visible red light wavelength range, two or more visible blue light wavelengths from a visible blue light wavelength range, and two or more visible green light wavelengths from a visible green light wavelength range.

When optical structure 400-*a* is included in a waveguide application, each grating structure may be configured to reflect a portion of light toward an exit pupil located at a fixed distance from the optical structure 400-*a*. For example, a waveguide may be configured to convey light from a light input region of the waveguide to the first grating structure 410 and the second grating structure 415. The grating medium 405 may be disposed at least partially within the waveguide and may be covered or enclosed by opposing substrates.

FIG. 4B is a plan view of an optical structure 400-*b* that supports skew mirror pupil equalization in accordance with various aspects of the present disclosure. Optical structure 400-*b* may include aspects a skew mirror 110 of the HMD 100 in FIG. 1, skew mirror 210 in FIG. 2A, skew mirror 305 in FIG. 3, and/or optical structure 400-*a* of FIG. 4A. Optical structure 400-*b* may include a grating medium 405-*a*, a first grating structure 410-*a*, a second grating structure 415-*a*, and a third grating structure 420.

The third grating structure 420 may be disposed within the grating medium 405-*a* with other grating structures. In some cases, the third grating structure 420 may be disposed between the first grating structure 410-*a* and the second grating structure 415-*a*. The third grating structure 420 may be at least partially non-overlapping with the first grating structure 410-*a* and at least partially non-overlapping with the second grating structure 415-*a*. The third grating structure may be configured to reflect light of the wavelength (e.g., the same wavelength of light as that which is reflected by the first grating structure 410-*a* and the second grating structure 415-*a*) about a third reflective axis offset from the surface normal 407 of the grating medium 405 at a third incidence angle different from the first incidence angle and the second incidence angle. In some examples, the third reflective axis is substantially parallel to the first reflective axis and the second reflective axis. In some embodiments, the first incidence angle may be greater than the third incidence angle and the third incidence angle may be greater than the second incidence angle. In this manner, each of these incidence angles may be different in a non-negligible amount and perform a reflective function associated with one or more regions of the optical structure 400-*b*.

In some examples, the first grating structure 410-*a* and the second grating structure 415-*a* are each configured to reflect a portion of light toward an exit pupil (not shown in FIG. 4B, but illustrated in other figures and examples described herein). The exit pupil may be a fixed distance from a surface of the waveguide (e.g., a waveguide including grating medium 405) such that a first end 412 of first grating structure 410-*a* that is non-overlapping with a first end 417 of the second grating structure 415-*a* that is overlapping with the first grating structure 410-*a* is farther from the exit pupil than the first end 417 of the second grating structure 415-*a*. In this manner, the exit pupil may be generally centered longitudinally (with respect to the grating medium 405-*a*) along the x-axis.

FIG. 4C is a plan view of an optical structure 400-*c* that supports skew mirror pupil equalization in accordance with various aspects of the present disclosure. Optical structure 400-*c* may include aspects a skew mirror 110 of the HMD 100 in FIG. 1, skew mirror 210 in FIG. 2A, skew mirror 305 in FIG. 3, optical structure 400-*a* of FIG. 4A, and/or optical structure 400-*b* of FIG. 4B. Optical structure 400-*c* may include a grating medium 405-*b*, a first grating structure 410-*b*, a second grating structure 415-*b*, and a fourth grating structure 430.

The fourth grating structure 430 may be disposed within the grating medium 405-*b* with other grating structures. In some cases, the fourth grating structure 430 is non-overlapping with the first grating structure 410-*b*. This occurs when a plurality of grating structures are spread across the grating medium 405-*b* such that the length of grating structures, which may be generally uniform in length from one to the other, are shorter by at least half of the overall length of the grating medium 405-*b*. In some cases, the fourth grating structure 430 will also at least partially overlap with another grating structure, such as the second grating structure 415-*b*. The fourth grating structure 430 may be configured to reflect light of the wavelength about a fourth reflective axis offset from the surface normal 407 of the grating medium 405-*b* at a fourth incidence angle different from the first incidence angle and the second incidence angle. In some examples, the fourth reflective axis is substantially parallel to the first reflective axis and the second reflective axis. In some embodiments, the first incidence angle may be greater than the second incidence angle and the second incidence angle may be greater than the fourth incidence angle.

It is to be understood that the third and fourth designations used for the third grating structure 420 in FIG. 4B and the fourth grating structure 430 in FIG. 4C are arbitrary designations and can be considered simply as another or an additional grating structure grating structure to the first and second grating structures. The third grating structure 420 and the fourth grating structure 430 illustrate non-limiting examples of the partially overlapping and non-overlapping features of grating structures associated with skew mirror pupil equalization.

Figure 5:
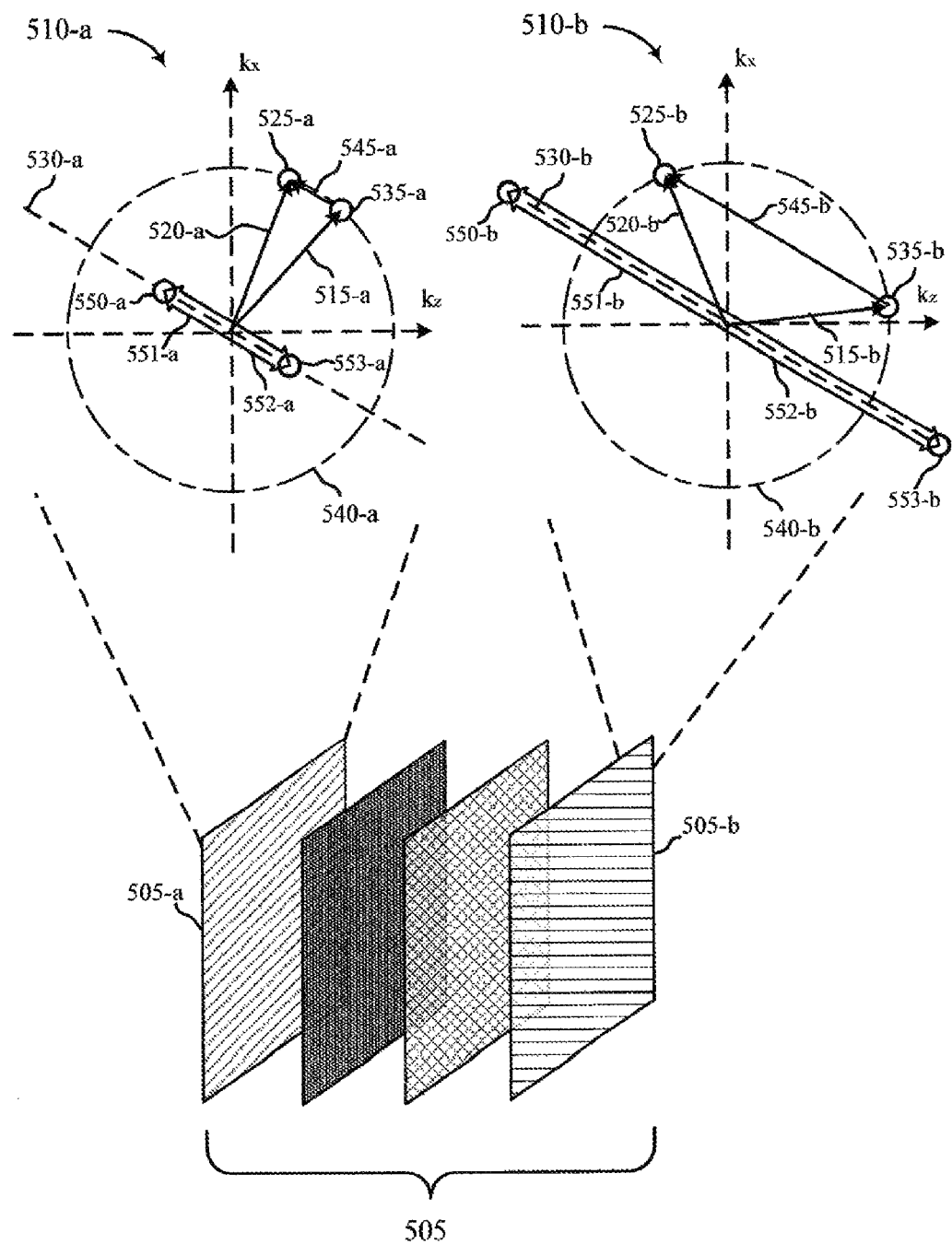
FIG. 5 is a diagram of an illustrative optical component with multiple grating structures in accordance with some embodiments

FIG. 5 is a diagram of an optical component 500 illustrating a plurality of grating structures 505. Grating structures 505 may be similar to the grating structures described in reference to FIGS. 3 and 4. Grating structures 505 are illustrated in an exploded view manner for discussion purposes, but these grating structures 505 may overlap and intermingle within a volume or space of a grating medium as described herein (e.g., FIGS. 4A-4C). Also, each grating structure may have a different diffraction angle response and may reflect light at a wavelength that is different than another grating structure.

Optical component 500 depicts a grating structure 505-*a* and a grating structure 505-*b*. The grating structure 505-*a* may have a corresponding k-space diagram 510-*a*, and the grating structure 505-*b* may have a corresponding k-space diagram 510-*b*. The k-space diagrams 510-*a* and 510-*b* may illustrate cases of Bragg-matched reconstruction by illuminating a hologram.

The k-space diagram 510-*a* may illustrate the reflection of an incident light by the grating structure 505-*a*. The k-space diagram 510-*a* is a representation of a mirror-like diffraction (which can be referred to as a reflection) of the probe beam by the hologram, where the probe beam angle of incidence with respect to the reflective axis is equal to the diffracted beam angle of reflection with respect to the reflective axis.

The k-space diagram 510-*a* has a positive sideband $\Delta n(\vec{k})$ k-space distribution 550-*a* that has an angle measured with respect to the z-axis, equal to that of the reflective axis 530-*a* of the grating structure 505-*a*. The k-space diagram 510-*a* also has a negative sideband $\Delta n(\vec{k})$ k-space distribution 553-*a* that has an angle measured with respect to the z-axis, equal to that of the reflective axis 530-*a*. The k-sphere 540-*a* may represent visible blue light, visible green light, or visible red light.

The k-space diagram 510-*a* depicts a case where probe beam 535-*a* produces a diffracted beam k-space distribution 525-*a*, $E_d(\vec{k})$, that is point-like and lies on the probe beam k-sphere 540-*a*. The diffracted beam k-space distribution 525-*a* is produced according to the convolution of Equation (4).

The probe beam 535-*a* has a k-space distribution, $E_p(\vec{k})$, that is also point-like. In this case, the probe beam is said to be "Bragg-matched" to the hologram, and the hologram may produce significant diffraction, even though the probe beam wavelength differs from the wavelength of the recording beams used to record the hologram. The convolution operation may also be represented geometrically by the vector sum $\vec{k}_d = \vec{k}_p + \vec{k}_{G+}$, where $\vec{k}_d$ represents a diffracted beam wave vector 520-*a*, $\vec{k}_p$ represents a probe beam wave vector 515-*a*, and $\vec{k}_{G+}$ represents a positive sideband grating vector 551-*a*. Vector 545-*a* represents the sum of the probe beam wave vector 515-*a* and the positive sideband grating vector 551-*a* according to the convolution of Equation (4). The k-space diagram 510-*a* also has a negative sideband grating vector 552-*a*.

The probe beam wave vector 515-*a* and the diffracted beam wave vector 520-*a* necessarily form the legs of a substantially isosceles triangle. The equal angles of this triangle are necessarily congruent with the angle of incidence and angle of reflection, both measured with respect to the reflective axis 530-a. Thus, the grating structure 505-a reflects light in a substantially mirror-like manner about the reflective axis 530-a.

The k-space diagram 510-b may illustrate the reflection of an incident light by the grating structure 505-b. The grating structure 505-b may reflect incident light at a plurality of incidence angles that are different than the incidence angles reflected by the grating structure 505-a. The grating structure 505-b may also reflect light at a different wavelength than the grating structure 505-a. The k-space diagram 510-b is a representation of a mirror-like diffraction (which can be referred to as a reflection) of the probe beam by the hologram, where the probe beam angle of incidence with respect to the reflective axis is equal to the diffracted beam angle of reflection with respect to the reflective axis. The k-space diagram 510-b has a positive sideband $\Delta n(\vec{k})$ k-space distribution 550-b that has an angle measured with respect to the z-axis, equal to that of the reflective axis 530-b of grating structure 505-b. The k-space diagram 510-b also has a negative sideband $\Delta n(\vec{k})$ k-space distribution 553-b that has an angle measured with respect to the z-axis, equal to that of the reflective axis 530-b. The k-sphere 540-b may represent visible blue light, visible green light, or visible red light. In some embodiments, the k-sphere may represent other wavelengths of electromagnetic radiation, including but not limited to ultraviolet or infrared wavelengths.

The k-space diagram 510-b depicts a case where the probe beam 535-b produces a diffracted beam k-space distribution 525-b, $E_d(\vec{k})$, that is point-like and lies on the probe beam k-sphere 540-b. The diffracted beam k-space distribution 525-b is produced according to the convolution of Equation (4).

The probe beam 535-b has a k-space distribution, $E_p(\vec{k})$, that is also point-like. In this case, the probe beam is said to be "Bragg-matched" to the hologram, and the hologram may produce significant diffraction, even though the probe beam wavelength differs from the wavelength of the recording beams used to record the hologram. The convolution operation may also be represented geometrically by the vector sum $\vec{k}_d = \vec{k}_p + \vec{k}_{G+}$, where $\vec{k}_d$ represents a diffracted beam wave vector 520-b, $\vec{k}_p$ represents a probe beam wave vector 515-b, and $\vec{k}_{G+}$ represents a positive sideband grating vector 551-b. Vector 545-b represents the sum of the probe beam wave vector 515-b and the positive sideband grating vector 551-b according to the convolution of Equation (4). The k-space diagram 510-b also has a negative sideband grating vector 552-b.

The probe beam wave vector 515-b and the diffracted beam wave vector 520-b necessarily form the legs of a substantially isosceles triangle. The equal angles of this triangle are necessarily congruent with the angle of incidence and angle of reflection, both measured with respect to the reflective axis 530-b. Thus, the grating structure 505-b reflects light in a substantially mirror-like manner about the reflective axis 530-b.

Figure 6:
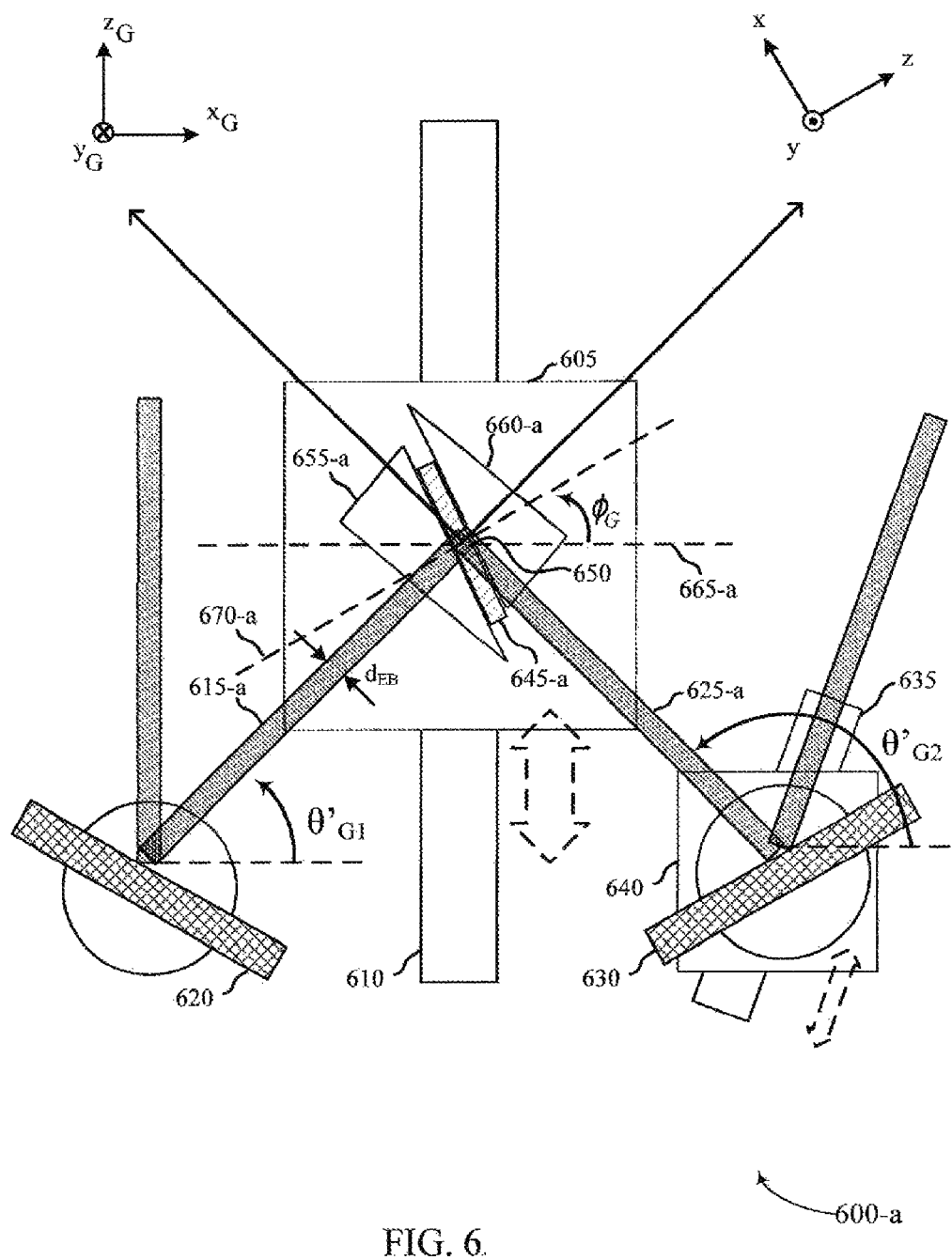
FIG. 6 is a diagram of an illustrative system that can be used to manufacture a skew mirror in accordance with some embodiments.

FIG. 6 is a system 600-a for manufacturing a skew mirror with comb-shifting capabilities in accordance with various aspects of the disclosure. System 600-a may include a sample stage carrier 605, a sample carrier rail 610, a first recording beam 615-a, a signal mirror 620, a second recording beam 625-a, a reference mirror 630, a reference mirror carrier rail 635, a reference mirror carrier 640, a grating medium 645-a, a hologram 650, a first prism 655-a, and a second prism 660-a.

System 600-a may include global coordinates ($x_G$, $y_G$, $z_G$) and skew mirror coordinates (x, y, z). The origin may be defined to be in the center of the grating medium 645-a. In some cases, the grating medium 645-a may comprise a generally rectangular shape where 'z' corresponds to the thickness of the grating medium 645-a, 'x' corresponds to the length of the in-plane side of the grating medium 645-a, and 'y' corresponds to the length of the in-plane side of the grating medium 645-a. The global angle for recording, $\theta_G$, may be defined as the angle of the first recording beam 615-a with respect to the $x_G$-axis inside grating medium 645-a. Skew mirror coordinates (x, y, z) may be converted to global coordinates by the following equation:

$$\begin{bmatrix} x_G \\ y_G \\ z_G \end{bmatrix} = \begin{bmatrix} \sin\phi_G & 0 & \cos\phi_G \\ 0 & -1 & 0 \\ \cos\phi_G & 0 & -\sin\phi_G \end{bmatrix} \begin{bmatrix} x \\ y \\ z \end{bmatrix} \quad (8)$$

The system 600-a may be used to configure recording beams to have a size approximately equal to a desired eye box size. In an implementation, the system 600-a may dispose rotating mirrors such as the signal mirror 620 and the reference mirror 630 to create the correct angles for the first recording beam 615-a and the second recording beam 625-a. The angle of the signal mirror 620 may be changed to produce a desired angle ($\theta_{G1}$) of first recording beam 615-a with width ~$d_{EB}$. The sample stage carrier 605 and the reference mirror carrier 640 may be positioned so as to illuminate the correct location with the recording beams for each exposure. The sample stage carrier 605 of the system 600-a may be positioned on the sample carrier rail 610 to facilitate the illumination of the grating medium 645-a with the first recording beam 615-a in the desired location. The reference mirror carrier 640 may be positioned on the reference mirror carrier rail 635 to facilitate the illumination of the grating medium 645-a with the second recording beam 625-a in the desired location. The grating medium 645-a may be referred to as a recording medium prior to or during hologram recording, and may include a photopolymer. In some embodiments, the grating medium may comprise photorefractive crystals, dichromated gelatin, photo-thermo-refractive glass, and/or film containing dispersed silver halide particles.

With the rotation of the signal mirror 620 and the reference mirror 630 set, the mirrors are arranged to direct the first recording beam 615-a and the second recording beam 625-a such that the recording beams intersect and interfere with each other to form an interference pattern that is recorded as a hologram 650 in the grating medium 645-a. The hologram 650 is an example of a grating structure. The system 600 may form multiple grating structures, each configured to reflect light of a particular wavelength about the skew axis 665-a at a plurality of incidence angles. Each grating structure may be formed using a plurality of exposures of the grating medium 645-a to coherent light having a particular wavelength. The plurality of incidence angles corresponding to each grating structure may be offset from one another by a minimum range of angles.

In some implementations, the recording beams may have widths that differ from each other, or they may be the same. The recording beams may each have the same intensity as each other, or intensity can differ among the beams. The intensity of the beams may be non-uniform. The grating medium 645-*a* is typically secured in place between the first prism 655-*a* and the second prism 660-*a* using a fluid index matched to both the prisms and the grating medium. A skew axis 665-*a* resides at a skew angle relative to the surface normal 670-*a*. As depicted in FIG. 6A, skew angle may be −30.25 degrees relative to the surface normal 670-*a*. The angle between the first and second recording beams may reside in a range from 0 to 180 degrees. The recorded skew angle relative to surface normal 670-*a* then becomes $\phi' = (\theta_{R1} + \theta_{R2} - 180°)/2 + \phi_G$ for in-plane system 600-*a*. For the nominal case where $\theta_{G2} = 180° - \theta_{G1}$, $\phi' = \phi_G$. In FIG. 6A, $\phi_G$ shows the nominal skew angle relative to surface normal. Additionally, in FIG. 6A, the exact depiction of angles of $\theta_{G1}$ and $\theta_{G2}$ are not shown. The angles of $\theta'_{G1}$ and $\theta'_{G2}$ are illustrated and correspond to the angles of $\theta_{G1}$ and $\theta_{G2}$. The angles of $\theta_{G1}$ and $\theta_{G2}$ are in relation to the first recording beam 615-*a* and the second recording beam 625-*a* beam, respectively, within the first prism 655-*a* and the second prism 660-*a*. The angles of $\theta'_{G1}$ and $\theta'_{G2}$ will be different from angles of $\theta_{G1}$ and $\theta_{G2}$ because of an index of refraction mismatch at the boundary between air and the prisms when the recording beams enter the prisms (e.g., the effects of Snell's Law or the law of refraction).

The first recording beam 615-*a* and the second recording beam 625-*a* are nominally symmetrical about the skew axis 665-*a* such that the first recording beam internal angle relative to the skew axis plus the second recording beam internal angle relative to the skew axis is equal to 180 degrees. Each of the first and second recording beams are typically collimated plane wave beams originating from a laser light source.

Refraction at air/prism boundaries, for example where the first recording beam 615-*a* intersects an air/prism boundary of the first prism 655-*a* and where the second recording beam 625-*a* intersects an air/prism boundary of the second prism 660-*a*, is shown figuratively rather than strictly quantitatively. Refraction at the prism/grating medium boundary may also occur. In implementations, the grating medium and prisms each have an index of refraction of approximately 1.5471 at the recording beam wavelength of 405 nm.

A skew angle for a hologram (including a mean skew angle for a collection of holograms) can be substantially identical to a reflective axis angle, meaning the skew angle or mean skew angle is within 1.0 degree of the reflective axis angle. Given the benefit of the present disclosure, persons skilled in the art will recognize that the skew angle and reflective axis angle can be theoretically identical. However, due to limits in system precision and accuracy, shrinkage of recording medium that occurs during recording holograms, and other sources of error, the skew angle or mean skew angle as measured or estimated based on recording beam angles may not perfectly match the reflective axis angle as measured by incidence angles and reflection angles of light reflected by a skew mirror. Nevertheless, a skew angle determined based on recording beam angles can be within 1.0 degree of the reflective axis angle determined based on angles of incident light and its reflection, even where medium shrinkage and system imperfections contribute to errors in estimating skew angle and reflective axis angle. It is understood that these medium shrinkage and system imperfections can be made arbitrarily small in the manufacture of skew mirrors with pupil equalization. In this regard, these medium shrinkage and system imperfections may be considered analogous to flatness of an ordinary or conventional mirror. In some examples, a fundamental limit associated with the manufacture of skew mirrors using volume holograms may be based on thickness of the recording medium.

A skew axis/reflective axis is generally called a skew axis when referring to making a skew mirror (for example when describing recording a hologram in a skew mirror grating medium), and as a reflective axis when referring to light reflective properties of a skew mirror. A skew angle for a hologram (including a mean skew angle for a collection of holograms) can be substantially identical to a reflective axis angle, meaning the skew angle or mean skew angle is within 1.0 degree of the reflective axis angle. Persons skilled in the art given the benefit of the present disclosure will recognize that the skew angle and reflective axis angle can be theoretically identical. However, due to limits in system precision and accuracy, shrinkage of recording medium that occurs during recording holograms, and other sources of error, the skew angle or mean skew angle as measured or estimated based on recording beam angles may not perfectly match the reflective axis angle as measured by incidence angles and reflection angles of light reflected by a skew mirror. Nevertheless, a skew angle determined based on recording beam angles can be within 1.0 degree of the reflective axis angle determined based on angles of incident light and its reflection, even where medium shrinkage and system imperfections contribute to errors in estimating skew angle and reflective axis angle. Given the benefit of the present disclosure, persons skilled in the art will recognize that the skew angle for a given hologram is the same as the grating vector angle for that hologram.

In a variation of the system 600-*a*, a variable wavelength laser is used to vary the wavelength of the first and second recording beams. Incidence angles of the first and second recording beams may be, but are not necessarily, held constant while the wavelength of the first and second recording beams is changed. Wavelengths may be comprised of visible red light wavelength, visible blue light wavelength, visible green light wavelength, ultraviolet (UV) wavelength, and/or infrared (IR) wavelength. Each grating structure of the system 600-*a* may reflect an incidence angle at a wavelength that is different than another grating structure. The system 600-*a* may have reflective properties that allow it to reflect light at a substantially different wavelength, and in particular a considerably longer wavelength, than the recording beam wavelength.

The magnitude of a difference in grating frequency between any two holograms in the skew mirrors described herein may sometimes be referred to as frequency gap $|\Delta K_G|$. Frequency gap $|\Delta K_G|$ can be a useful metric for describing hologram "spacing" (e.g. how close to each other in k-space the grating vectors for the any two holograms are). The frequency gap $|\Delta K_G|$ between a given hologram and an adjacent hologram (e.g., in k-space) may sometimes be referred to as the adjacent frequency gap $|\Delta K_G|$.

Among a set of multiple holograms (e.g., a set of volume holographic gratings), each hologram in the set has a corresponding grating vector in k-space. The grating vector has a corresponding grating vector magnitude $K_G$. A first hologram in the set is sometimes referred to as being "adjacent" to a second hologram in the set of holograms when the second hologram has the next highest or next lowest grating vector magnitude $K_G$ relative to the grating vector magnitude of the first hologram (among the holograms in the set). Each hologram in the set may be separated from one or two adjacent holograms in the set by an adjacent frequency gap $|\Delta K_G|$. The adjacent frequency gap $|\Delta K_G|$ may be the magnitude of the difference between the grating vector magnitudes $K_G$ for the adjacent holograms. For example, the first hologram in the set may have a first grating vector magnitude $K_{G1}$, the second hologram in the set may have a second grating vector magnitude $K_{G2}$, and the first grating vector magnitude $K_{G1}$ may be separated from the second grating vector magnitude $K_{G2}$ in k-space by the adjacent frequency gap $|\Delta K_G|$.

Each hologram in the set is separated from one or more other holograms in the set by a corresponding adjacent frequency gap $|\Delta K_G|$ (e.g., the adjacent frequency gaps across the set need not be uniform). In some embodiments, the mean adjacent frequency gap $|\Delta K_G|$ for the entire set of holograms may influence the performance of the skew mirror. The grating vector magnitude $K_G$ of a given hologram may determine the grating frequency for the hologram (e.g., the frequency of refractive index modulations in the grating medium in physical space as well as the wavelength of light that is Bragg matched to the hologram). Grating vector magnitude $K_G$ may therefore sometimes be referred to herein as grating frequency $K_G$. Each hologram in the set of holograms has a corresponding grating frequency $K_G$. The direction of the grating vector associated with grating frequency $K_G$ may give the direction (orientation) of the refractive index modulations in the grating medium in physical space, as well as the angle at which the hologram diffracts light. Grating frequency $K_G$ and the frequency gap $|\Delta K_G|$ may be expressed in various units, including, but not limited to, radians per meter (rad/m) and/or sinc peak to sinc nulls.

A relatively small mean adjacent frequency gap $|\Delta K_G|$ for the set of holograms can correspond to relatively high skew mirror image fidelity (e.g., for the entire set of holograms). However, where the mean adjacent frequency gap $|\Delta K_G|$ for a set of holograms is relatively small, the total number of holograms in the set is larger in order to span a given adjacent frequency gap $|\Delta K_G|$ range for the set. Moreover, given that recording capacity for grating mediums is typically limited by dynamic range (usually expressed as $\Delta n$), recording more holograms in a set usually means that each hologram in the set is weaker (i.e., is recorded more faintly in the medium). Accordingly, tension exists between having relatively small adjacent frequency gaps $|\Delta K_G|$ for a set of holograms (which requires more holograms, other things being equal), and having larger adjacent frequency gaps $|\Delta K_G|$ for the set, which allows recording of fewer, but stronger holograms.

Fewer, stronger holograms typically results in stronger reflectance or stronger output coupling depending on the geometry and skew axis of the skew mirror. In the reflection geometry, where the light has only one interaction with the skew mirror, the maximum reflectance occurs when the number of holograms is equivalent to the M # of the material such that each hologram has 100% diffraction efficiency. In the waveguide geometry there are multiple interactions with the holographic recording and the number of interactions is dependent on the guided angle, thus maximum output coupling is more complicated. To optimize eye box efficiency (e.g., the ratio of the amount of light in the "eye box" and what is coupled in), lower densities of holograms are used. However, this results in significant intensity variation across the eye box. Thus, in the waveguide geometry, there is a tension between large eye box efficiency and intensity uniformity across the eye box.

In order to mitigate these issues, a skew mirror (e.g., volume holographic grating structures that include one or more sets of volume holographic gratings) may be configured to exhibit larger diffraction efficiency for a larger range of angles and/or for a larger range of wavelengths within the band of the read source by the method of "comb shift" writing. In some embodiments, skew mirror hologram comb shift writing and sparsely writing holograms across the designed field of view (FOV) may reduce medium dynamic range (frequently expressed as $\Delta n$) required to achieve a desired level of performance, or increase the diffraction efficiency obtainable. Sparse writing typically refers to multiple holograms having adjacent frequency gap $|\Delta K_G|$ of greater than 4.0 sinc peak to sinc nulls. In some embodiments, sparsely written holograms have adjacent frequency gaps $|\Delta K_G|$ around 12. In some embodiments, sparsely written holograms have adjacent frequency gaps $|\Delta KG|$ in a range from 8.0 to 12 sinc peak to sinc nulls.

Figure 7:
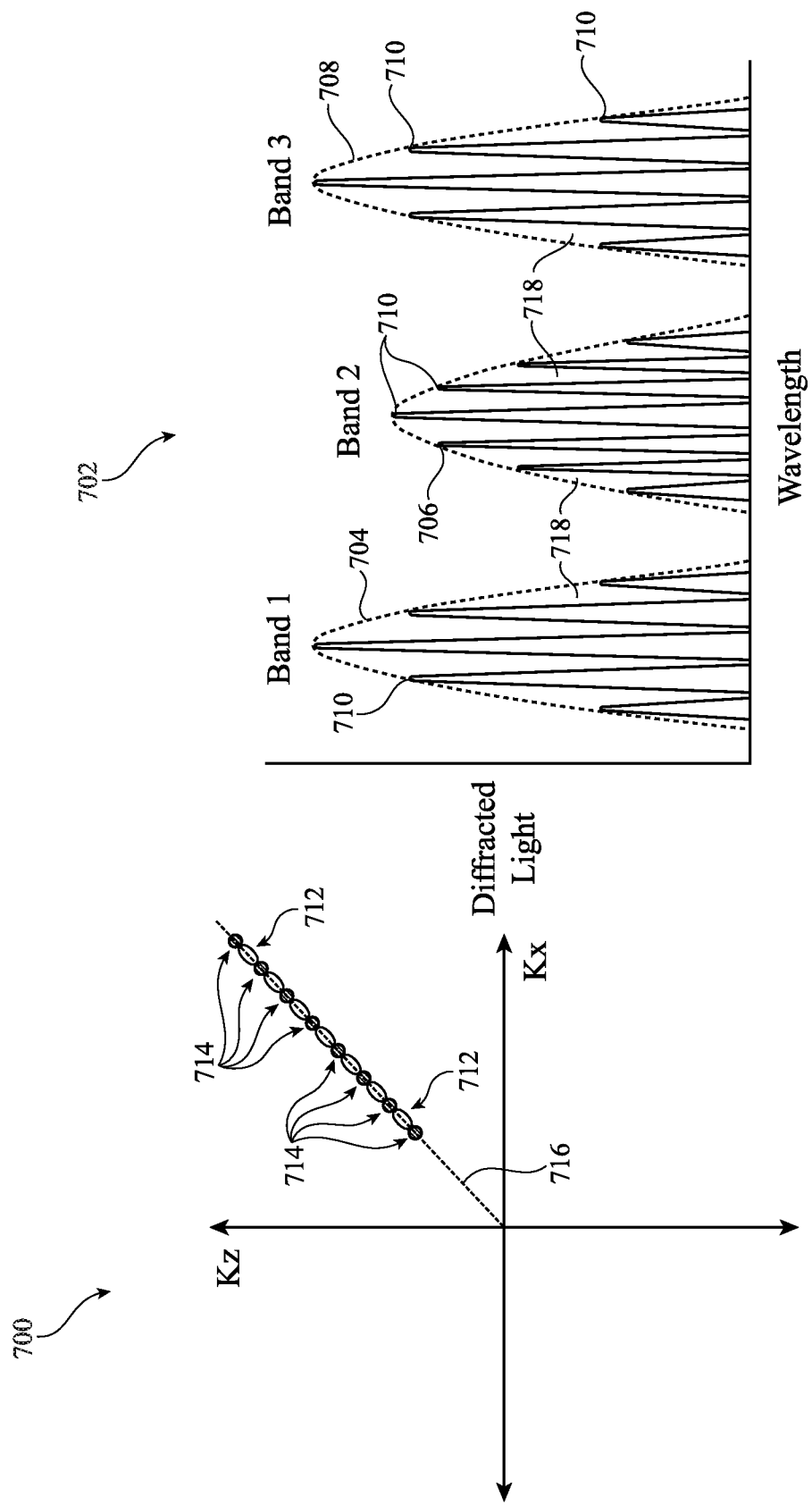
FIG. 7 shows illustrative k-space and diffracted light response plots for a set of holograms that exhibit adjacent frequency gaps in accordance with some embodiments.

An illustration of sparsely written holograms reducing the range of diffracted angles for a range of wavelengths within the band of the read source is shown in FIG. 7. The example of FIG. 7 demonstrates that a range of wavelengths within the band of the read source is not diffracted toward the exit pupil.

As shown in FIG. 7, k-space diagram 700 plots the distribution of holograms in a sparsely written skew mirror, whereas diagram 702 is a representative diagram of the diffracted light from the bandwidth of the read source (e.g., a spectrum of light diffracted in a single direction/pixel). As shown by diagram 700, the skew mirror may include a set of holograms, where each hologram in the set has a corresponding grating frequency $K_G$, as shown by points 714 (e.g., each point 714 has an associated grating frequency corresponding to the distance from the point to the origin). Each hologram in the set may, for example, lie within the same physical volume of grating medium (e.g., each hologram may overlap and be superimposed with the other holograms in the set). The grating vectors for each hologram in the set may be oriented in the same direction (e.g., along axis 716). In this way, each of the holograms in the set may exhibit a substantially constant (uniform) reflective axis for reflecting light in a desired direction (e.g., towards an eye box). Each grating frequency may be separated from an adjacent grating frequency of the set of holograms by a respective adjacent frequency gap $|\Delta K_G|$, illustrated in FIG. 7 as gaps 712 in k-space between points 714 (e.g., where the length of gaps 712 define the adjacent frequency gaps $|\Delta K_G|$). There may be no holograms in the set that lie within the adjacent frequency gaps associated with gaps 712.

The holograms in the set (e.g., the holograms having grating frequencies associated with points 714 in k-space) may each diffract light of a particular wavelength in a given direction (e.g., the holograms may be Bragg matched to particular wavelengths). In other words, each hologram in the set may diffract light corresponding to a respective peak 710 in diagram 702. The set of holograms may be configured to diffract light within different bands of wavelengths such as "Band 1," as shown by envelope 704, "Band 2," as shown by envelope 706, and "Band 3," as shown by envelope 708. Bands 1, 2, and 3 may be selected to match the wavelengths of light to be diffracted (e.g., light produced by light projector 320 of FIG. 3A). As one example, Band 1 may correspond to blue wavelengths, Band 2 may correspond to green wavelengths, and Band 3 may correspond to red wavelengths (e.g., for an RGB projection system).

Adjacent frequency gaps (e.g., frequency gaps associated with gaps 712) in the set of holograms may produce spectrum nulls 718 in the light diffracted by the skew mirror (e.g., because no holograms lie in gaps 712 and are Bragg matched to light at the wavelengths associated with nulls 718). In this way, the set of holograms may exhibit a comb-shaped diffraction response as a function of wavelength. If the hologram distribution is not sufficiently dense for the given optical design, spectrum nulls 718 may produce undesirable color gaps in the diffracted light that reaches the eye box (e.g., particularly in scenarios where in-coupled light traverses many different regions of the skew mirror having aligned peaks 710).

To mitigate these effects, the skew mirror may be configured to perform comb shifting operations, in which greater diffraction power to the eye box is enabled by spatial multiplexing multiple sets of holograms (gratings) across multiple regions. In addition, the comb-shifting operations may make the diffraction more homogenous across the area of the eye box.

Figure 8:
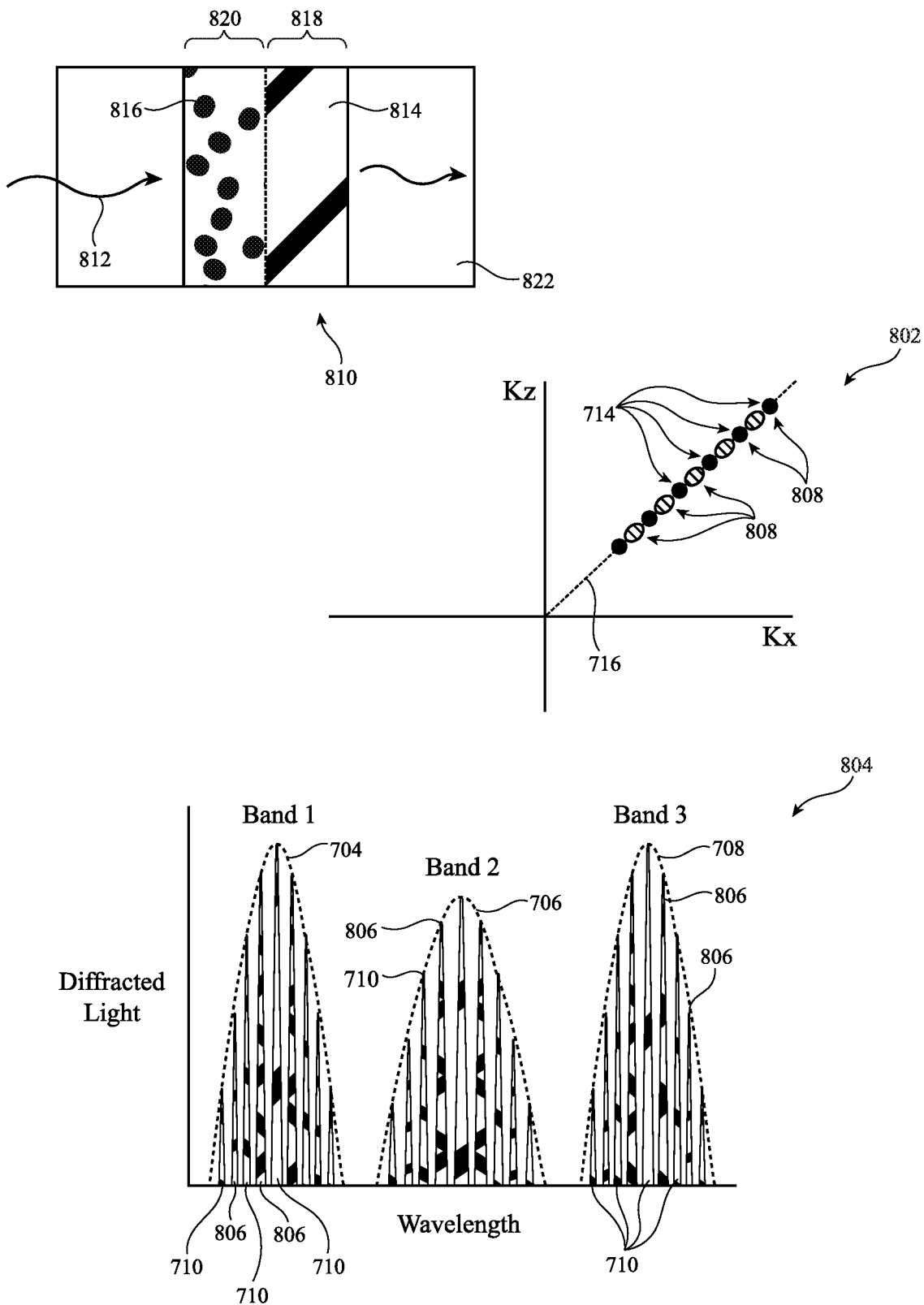
FIG. 8 shows how an illustrative comb-shifted skew mirror may include comb-shifted sets of holograms in different regions of a grating medium in accordance with some embodiments.

FIG. 8 illustrates how the skew mirror may perform comb shifting operations. As shown in FIG. 8, the skew mirror may include a first set of holograms 816 in region 820 of grating medium 822 and a second set of holograms 814 in region 818 of grating medium 822. Regions 818 and 820 may, for example, be laterally offset from each other such that there is little or no overlap of the holograms between regions. In another suitable arrangement, region 818 may partially overlap region 820. Each hologram in set 816 may lie within the same physical volume of grating medium 822 (e.g., each hologram may overlap and be superimposed with the other holograms in set 816). Similarly, each hologram in set 814 may lie within the same physical volume of grating medium 822 (e.g., each hologram may overlap and be superimposed with the other holograms in set 814). Incoming light 812 may pass through region 820. The light 812 that is not diffracted by the set 816 of holograms in region 820 may propagate to region 818. The sets of holograms in grating medium 822 may perform any desired diffraction operations (e.g., input coupling, output coupling, cross coupling, etc.). In one suitable arrangement that is described herein as an example, the sets of holograms in grating medium 822 are used to form an output coupler 810 (e.g., for diffracting light 812 into an eye box).

Each hologram in set 816 may have a corresponding grating frequency as shown by points 714 in k-space diagram 802 (e.g., points 714 as shown in FIG. 7). In the absence of other sets of holograms in other regions of grating medium 822, adjacent frequency gaps (e.g., frequency gaps associated with gaps 712 of FIG. 7) may be present between each grating frequency of set 816. However, the holograms in set 814 may be comb-shifted with respect to the holograms in set 816. For example, each hologram in set 814 may have a corresponding grating frequency as shown by points 808 in k-space diagram 802 (each point 808 has an associated grating frequency corresponding to the distance from the point to the origin). The grating frequencies associated with points 808 may be selected to lie within the adjacent frequency gaps between the grating frequencies associated with points 714 (e.g., the grating frequencies associated with points 808 may lie within the gaps 712 between points 714 of FIG. 7). The grating vectors associated with points 808 (e.g., the grating vectors of set 814) may be oriented in the same direction as the grating vectors of set 816 (e.g., along axis 716). This may configure set 814 to diffract light 812 in the same direction as set 816 (e.g., towards an eye box).

Each hologram in set 814 may diffract light corresponding to a respective peak 806 in diagram 804. Because grating frequencies 808 lie in the frequency gaps between the grating frequencies associated with points 714, each hologram in set 814 may diffract light at wavelengths lying in the nulls between the peaks 710 associated with set 816 and the grating frequencies associated with points 714 (e.g., peaks 806 may lie within spectrum nulls 718 of FIG. 7). Because light 812 at these wavelengths remains after first passing through set 816 (e.g., because light at these wavelengths is not diffracted by set 816), set 814 may diffract light at these wavelengths in a desired direction (e.g., towards the eye box).

In other words, splitting output coupler 810 into two distinct regions 820 and 818 each having respective sets 816 and 814 of holograms with grating frequencies that are slightly shifted along the skew axis from one another may cause the diffraction peaks from the two regions to become interleaved with respect to each other (e.g., as shown in diagram 804). Diffraction from region 820 does not deplete the light 812 that may then be diffracted by region 818. This results in a greater amount of light within the bandwidth of the light source being diffracted to the eye box (e.g., light projector 320 of FIG. 3A, read LEDs, etc.), due to the shifted grating frequencies between the regions.

While the example of FIG. 8 only includes two spatially multiplexed sets of holograms, in general, grating medium 812 may include any desired number of spatially-multiplexed sets of holograms from the left to the right of FIG. 8. Similar structures can also be used to increase the output efficiency of the first pupil expander (e.g. a cross coupler in a 2D expanded waveguide) or for any other desired light re-directing components in an optical system (e.g., output coupler, cross coupler, and/or input couplers).

Figure 9:
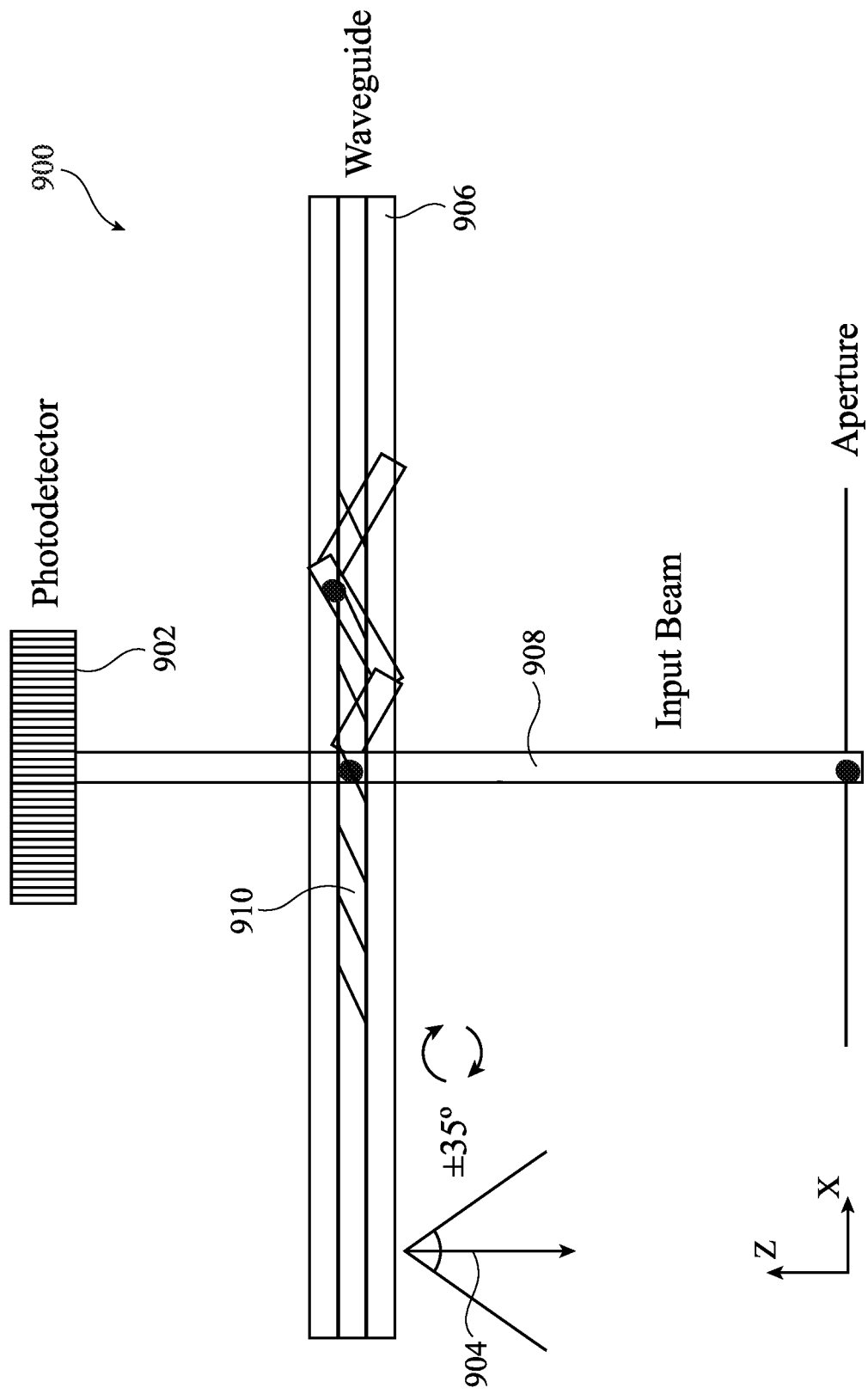
FIG. 9 is a diagram of an illustrative measurement system that may be used to measure the response of skew mirrors in accordance with some embodiments.

FIG. 9 shows an illustrative optical system 900 that may be used to measure the performance of a grating medium having spatially multiplexed sets of holograms such as sets 816 and 814 of FIG. 8. As shown in FIG. 9, a collimated laser beam 908 may be used to probe the holographic region 910 of samples (e.g., sample skew mirrors disposed in waveguide 906). The samples may be rotated in the X-Z plane by angle 904 and the diffraction efficiency may be quantified by the amount of light coupled into the waveguide, where light diffracted/coupled into the waveguide would result in a reduction in transmission intensity as measured by photodetector 902. In addition, the samples may be translated and diffraction efficiency may be measured at different spatial locations (regions) within the sample. In this configuration the skew mirrors are operating as an input coupler.

Figure 10:
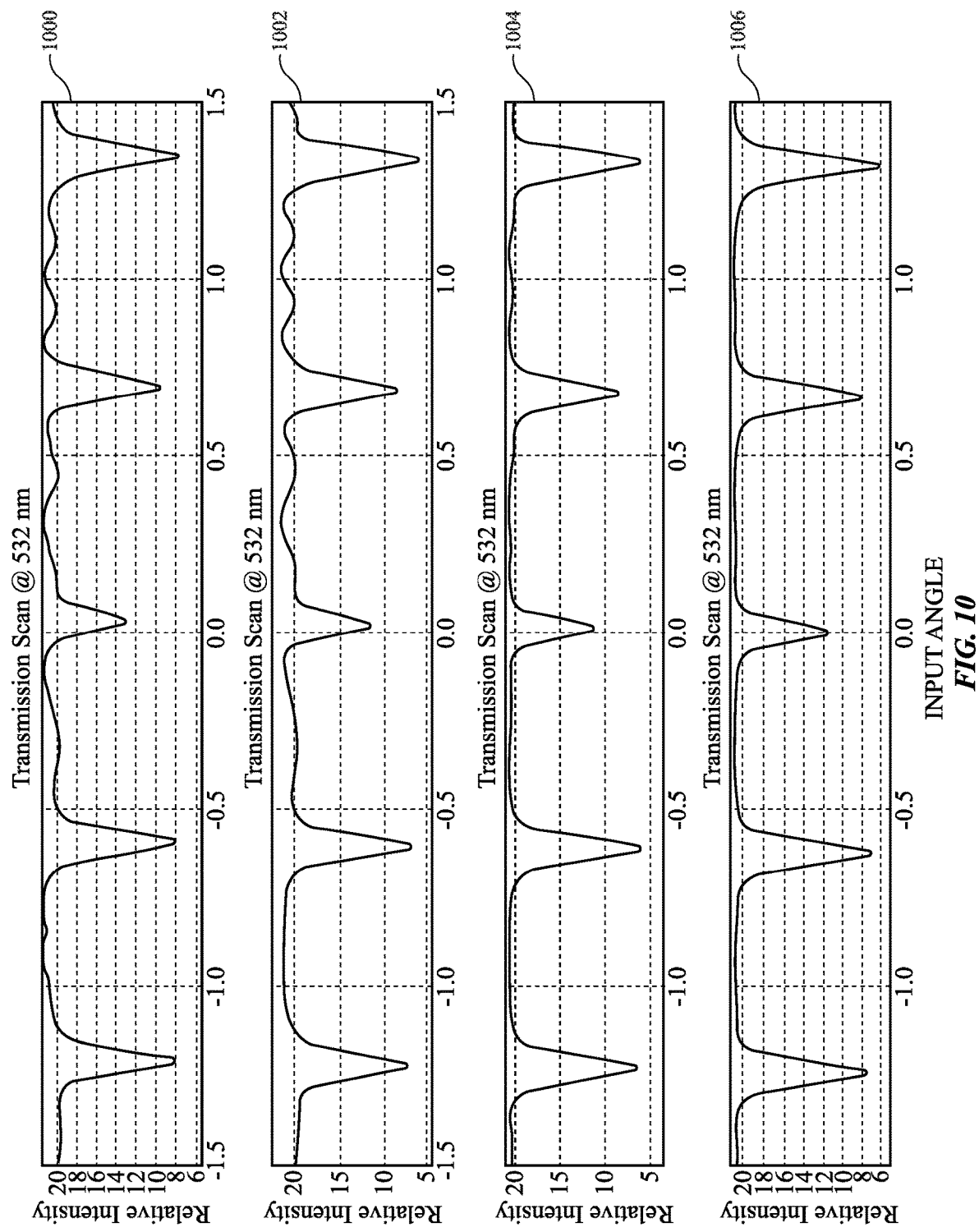
FIG. 10 is a plot of intensity as a function of rotation angle for a skew mirror without comb-shifting in accordance with some embodiments.

FIG. 10 shows the measured response of photodetector 902 as a function of angle 904 of FIG. 9 for a sample nominal skew mirror without comb-shifting that has been probed at four different regions along the length of the sample (e.g., a sample skew mirror having 127 globally overlapping holograms throughout the entire grating medium). The dips as a function of angle in FIG. 10 may, for example, correspond to the peaks as a function of wavelength in FIGS. 7 and 8 (e.g., due to the arrangement of system 900 of FIG. 9 used to probe the samples). As shown in FIG. 10, the sample is probed at four different regions, response curve 1000 is measured at the first region, response curve 1002 is measured at the second region, response curve 1004 is measured at the third region, and response curve 1006 is measured at the fourth region. As shown by curves 1000-1006, the angular location of the holograms remains the same across each of the four regions.

Figure 11:
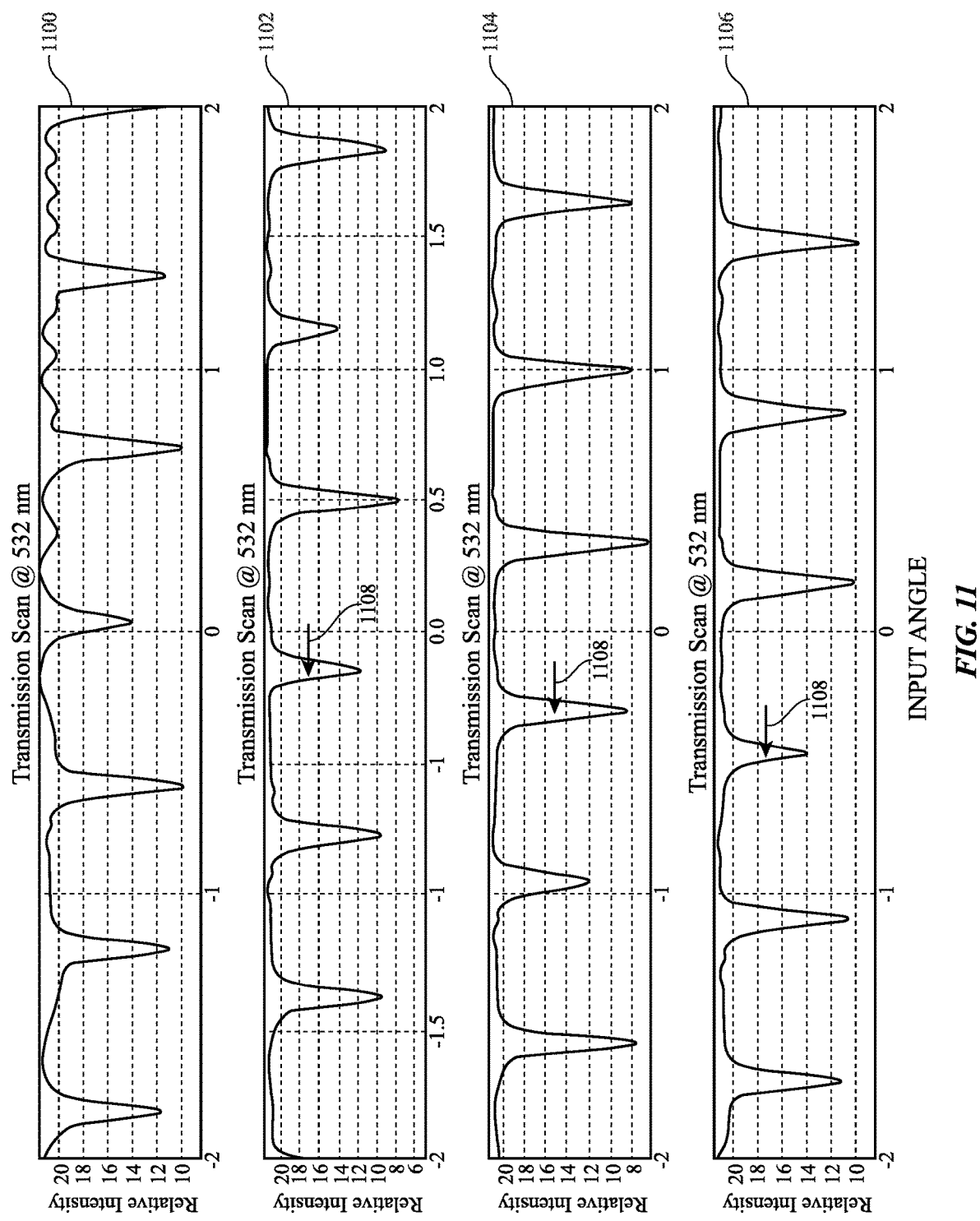
FIG. 11 is a plot of intensity as a function of rotation angle for an illustrative comb-shifted skew mirror having comb-shifted sets of holograms in different regions of a grating medium in accordance with some embodiments.

FIG. 11 shows the measured response of photodetector 902 as a function of angle 904 of FIG. 9 for a sample skew mirror with comb-shifting between the four regions. Each of the four regions may, for example, include a corresponding set of holograms that lie within the frequency gaps of the sets of holograms in the other regions. As shown in FIG. 11, the sample is probed at each of the four regions, response curve 1100 is measured at the first region, response curve 1102 is measured at the second region, response curve 1104 is measured at the third region, and response curve 1106 is measured at the fourth region.

As just one example, the first region may include a first set of holograms (e.g., 127 co-located holograms), the second region may include a second set of holograms (e.g., 127 co-located holograms), the third region may include a third set of holograms (e.g., 127 co-located holograms), and the fourth region may include a fourth set of holograms (e.g., 127 co-located holograms). Each region may include other numbers of holograms if desired. Each of the first, second, third, and fourth regions may be approximately 4.5 mm in width, as just one example. Within each region, the multiple holograms of that region may have a mean adjacent frequency gap of approximately 12 sinc peak to sinc nulls, as just one example. Collectively, all 508 holograms in the coupler (127 per region) have a mean adjacent frequency gap of 3 sinc peak to sinc nulls. This is merely illustrative. Each region may have an adjacent frequency gap of between 4 and 20 sinc peak to sinc nulls, between 6 and 14 sinc peak to sinc nulls, greater than 20 sinc peak to sinc nulls, greater than 4 sinc peak to sinc nulls, etc.). The mean adjacent frequency gap of the coupler (e.g., all of the regions collectively) may be approximately equal to the adjacent frequency gap of one of the regions (sets) divided by the total number of regions (sets), for example.

As shown by curves 1100-1106, the angular location of the holograms of the comb-shifted skew mirror are shifted from one another by angle 1108 (e.g., approximately 0.15 degrees) in each subsequent region. Diffraction within each region therefore does not deplete the light that is then diffracted by subsequent regions.

The data shown in FIGS. 10 and 11 demonstrates the method of comb shifting within the skew mirror (e.g., a comb-shifted skew mirror). The skew mirror may be used to form an input coupler, output coupler, interleaved couplers, diamond expanders, and/or cross-coupler or other light redirecting elements. The comb-shifted skew mirror enables diffraction from a different set of wavelengths within the bandwidth of a light source (e.g., LED) for the different exposed regions. As previously mentioned, this results in a greater diffraction efficiency across the entire holographic region as well as a more consistent intensity across the eye-box. The beam may be coupled into the comb shifted skew mirror (e.g., in system 900 of FIG. 9) with the internal guided angle set to 60 degrees, as an example. The beam may interact with the output coupler multiple times (e.g., four times), producing multiple (e.g., four) replicated pupils, which are measured with the photodetector.

Figure 12:
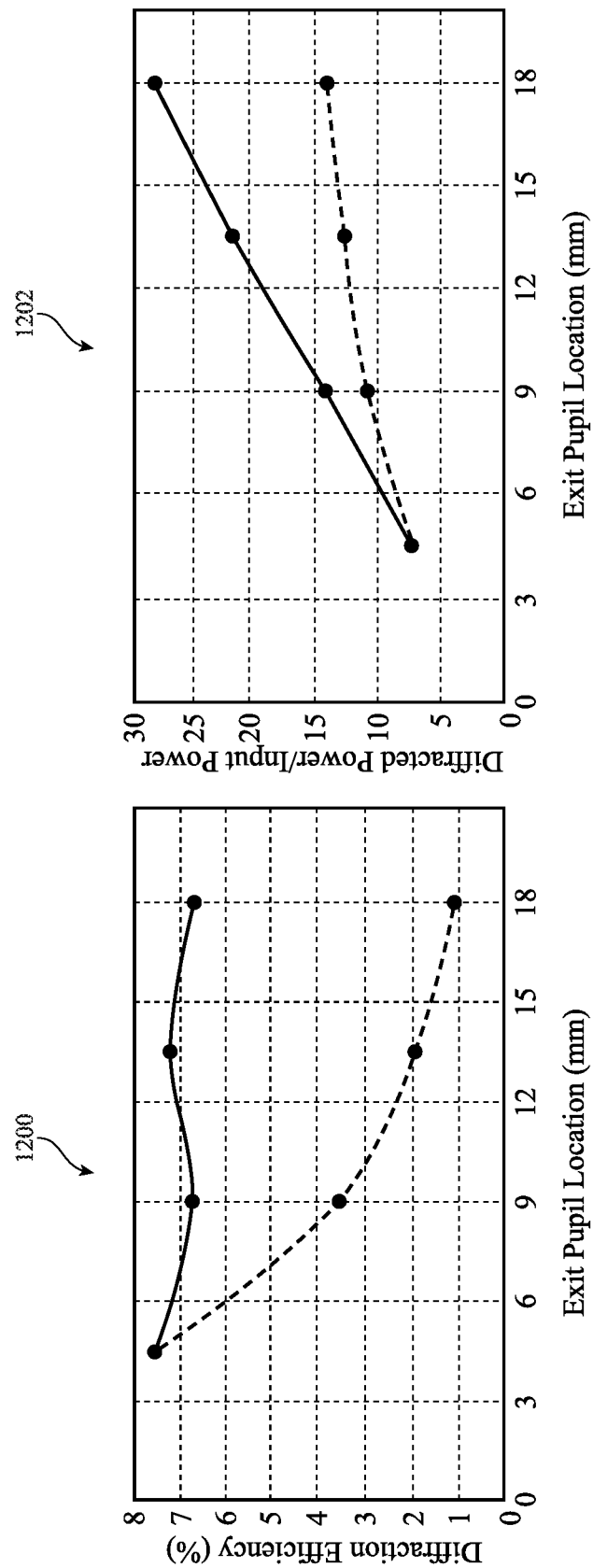
FIG. 12 illustrates plots of diffraction efficiency and diffracted power as a function of exit pupil location for a skew mirror without comb-shifting and for an illustrative comb-shifted skew mirror in accordance with some embodiments.

The measured diffraction efficiency across the output coupler for both the nominal skew mirror associated with FIG. 10 and the comb-shifted skew mirror associated with FIG. 11 is shown in FIG. 12. As shown in FIG. 12, the solid line of graph 1200 illustrates the diffraction efficiency across the output coupler (e.g., for the collection of gratings in the output coupler rather than for a single grating) for a comb-shifted skew mirror, and the dashed line illustrates the diffraction efficiency across the output coupler (e.g., for the collection of gratings in the output coupler rather than for a single grating) for a nominal skew mirror without comb-shifting. The solid line in graph 1202 illustrates total diffracted power across the output coupler for a comb-shifted skew mirror whereas the dashed line illustrates the total diffracted power across the output coupler for a nominal skew mirror without comb-shifting. As shown by graphs 1202 and 1200, comb-shifting the skew mirror may produce an increase in diffraction efficiency and diffracted power across exit pupil locations (e.g., across the entire holographic region, thereby producing more consistent intensity across the eye box).

The comb-shifted skew mirrors described above may be used for any desired light redirection implementations. In one suitable arrangement, the comb-shifted skew mirrors may, if desired, be used to perform eye box equalization (e.g., as described above in connection with FIG. 3). In order to produce comb-shifted skew mirrors to perform eye box equalization, the size of the exposed region of grating medium during hologram writing needs to be reduced to enable spatial multiplexing for multiple sets of gratings across multiple regions within the eye box. The local density of gratings enables high diffraction efficiency and the summation of all the exposed regions of the coupler has a high hologram density.

Figure 13:
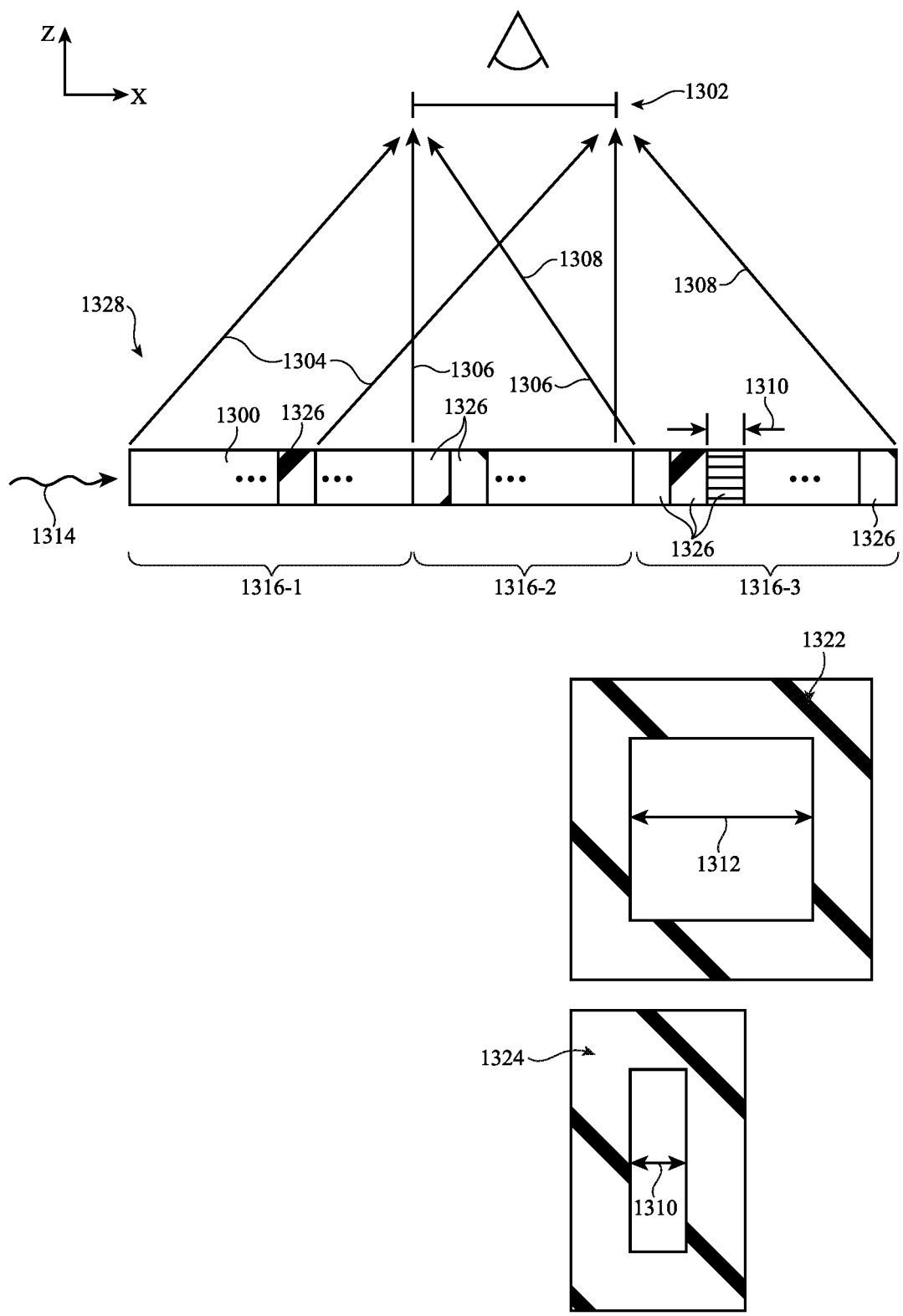
FIG. 13 is a diagram showing how an illustrative comb-shifted skew mirror may be implemented in an output coupler that performs pupil equalization in accordance with some embodiments.

FIG. 13 is a diagram showing how comb-shifted skew mirrors may be used to perform eye box equalization. As shown in FIG. 13, comb-shifted skew mirror 1328 may be used to form an output coupler that redirects input light 1314 towards eye box 1302. Comb-shifted skew mirror 1328 (sometimes referred to herein as comb-shifted volume holographic grating structures 1328) may include a grating medium 1300 divided into multiple regions 1316 (e.g., regions having a width equal to the width of eye box 1302) such as regions 1316-1, 1316-2, and 1316-3 (e.g., regions such as regions 312, 314, and 316 of FIG. 3A). Each region 1316 may include multiple sets of holograms that are configured to diffract the input light in a respective direction towards eye box 1302. For example, the volume holograms in region 1316-1 may have grating vectors with grating frequencies selected to diffract the input light in direction 1304 towards eye box 1302. The volume holograms in region 1316-2 may have grating vectors with grating frequencies selected to diffract the input light that was not diffracted in region 1316-1 in direction 1306 towards eye box 1302. The volume holograms in region 1316-3 may have grating vectors with grating frequencies selected to diffract the input light that was not diffracted in regions 1316-1 and 1316-2 in direction 1308 towards eye box 1302 (e.g., the grating vectors in each region may have the same grating vector direction whereas grating frequency is adjusted to diffract light towards the eye box).

Each region 1316 may be divided into a number of sub-regions 1326. Each sub-region 1326 may include a corresponding set of volume holograms having grating frequencies separated by adjacent frequency gaps (e.g., each sub-region 1326 may include a set of gratings such as sets 816 or 814 of FIG. 8). Each set of gratings within each region 1316 may be comb-shifted with respect to the other sets of gratings within that region 1316 (e.g., each sub-region 1326 may have a corresponding set of holograms that fills the adjacent frequency gaps of the other sub-regions 1326 within the corresponding region 1316).

For example, region 1316-3 may include multiple sub-regions 1326. The first (left-most) sub-region 1326 in region 1316-3 may have a first set of grating vectors that have grating frequencies to diffract light in direction 1308 and that are separated by adjacent frequency gaps (e.g., the first sub-region 1326 in region 1316-3 may have grating frequencies associated with points 714 as shown in FIG. 8). The second (second-to-left-most) sub-region 1326 in region 1316-3 may have grating vectors that have grating frequencies to to diffract light in direction 1308 and that lie within the adjacent frequency gaps of the set of holograms in the first sub-region 1326 (e.g., the second sub-region 1326 in region 1316-3 may have grating frequencies 808 as shown in FIG. 8). Similarly, the subsequent sub-regions 1326 in region 1316-3 may fill the remaining frequency gaps that are not covered by the previous sub-regions 1326 in region 1316-3. In this way, the different sets of holograms in sub-regions 1326 of region 1316-3 may diffract light of many wavelengths in the same direction towards eye box 1302. This may fill eye box 1302 with uniform intensity light from region 1316-3 without significant gaps in color, while allowing the number of superimposed holograms within any given volume of grating medium 1300 (e.g., within reach sub-region 1326) to be relatively small. Similar processes may be performed by the sub-regions 1326 in each region 1316 across the length of skew mirror 1328 to perform pupil equalization.

In nominal skew mirrors without comb-shifting, a relatively large slit such as slit 1322 is used to write the holograms in regions 1316. Slit 1322 may have width 1312 (e.g., a width equal to the width of each region 1316 and the width of eye box 1302). Slit 1322 is placed over each region 1316 during writing so that holograms are written to the entire region 1316 at once in this scenario (e.g., by illuminating grating medium 1300 through the slit while the rest of the grating medium is masked). The slit is moved across the length of grating medium 1300 to record holograms at the other regions 1316. In skew mirrors with comb-shifting such as skew mirror 1328, a smaller slit such as slit 1324 is used to record the holograms. Slit 1324 may have a width 1310 that is less than width 1312 (e.g., width 1324 may be equal to the width of sub-regions 1326). Slit 1310 is placed over each sub-region so holograms may be recorded in each sub-region 1326. The slit is moved across the length of grating medium 1300 to record holograms at the other sub-regions 1326.

The example of FIG. 13 in which only three separated regions 1316 are shown is merely illustrative. In practice, if desired, there may be other regions 1316 overlapping the regions shown in FIG. 13 to perform pupil equalization with a finer granularity. Each of the set of possibly overlapping regions 1316 may each be spanned by its own corresponding set of non-overlapping sub-regions 1326.

In some embodiments, comb-shifted skew mirrors as described herein may be used to form an input coupler. In some embodiments which include an input coupler, a large pupil may be desired for optimal pupil stitching across the eye-box of the entire FOV, which requires a large input coupler. However, for a nominal skew mirror input coupler that has been optimized for brightness, this can cause a large amount of the angular and optical bandwidth never to be coupled into the waveguide and a large amount of loss due to overlap with the guided modes and the physical extent of the input coupler. By using a comb-shifted skew mirror for the input coupler, a larger amount of the angular and optical bandwidth will be sampled across the pupil and the amount of output coupling due to the input coupler will be severely reduced or eliminated because the different comb shifted regions are sampling different parts of the angular and optical bandwidth. An illustration of an input-coupler having comb-shifted sets of holograms is shown in FIG. 14.

Figure 14:
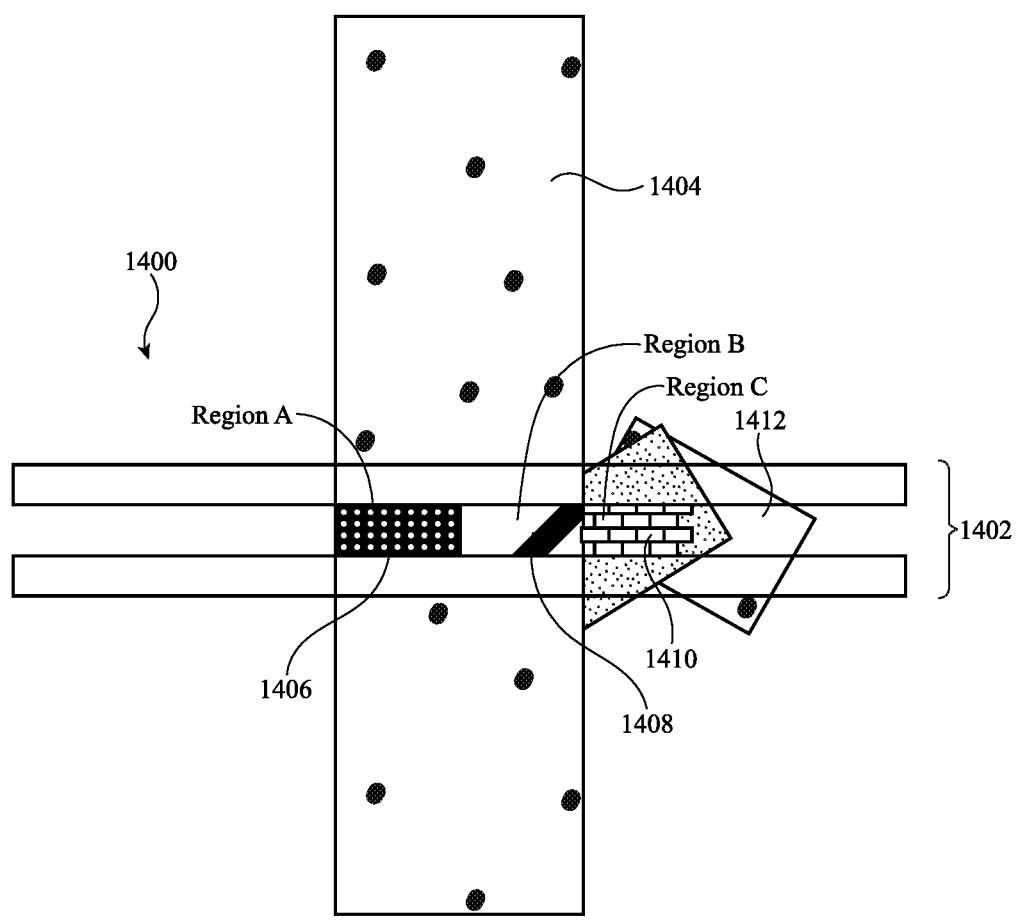
FIG. 14 is a diagram showing how an illustrative comb-shifted skew mirror may be implemented in an input coupler in accordance with some embodiments.

As shown in FIG. 14, an input coupler 1400 may include a comb-shifted skew mirror having multiple sets (sub-regions) of holograms such as a first set 1406 in Region A, a second set 1408 in Region B, and a third set 1410 in Region C. The grating vectors of each region may be oriented to couple input light 1404 into waveguide 1402, as shown by light 1412. The grating frequencies of set 1408 may lie in the adjacent frequency gaps between the grating frequencies of sets 1406 and 1410 (e.g., the grating frequencies of set 1406 may be comb-shifted with respect to the grating frequencies of sets 1408 and 1410).

While various embodiments have been described and illustrated herein, other means and/or structures for performing the function and/or obtaining the results and/or one or more of the advantages described herein may be used, and each of such variations and/or modifications is deemed to be within the scope of the embodiments described herein. More generally, all parameters, dimensions, materials, and configurations described herein are merely illustrative and actual parameters, dimensions, materials, and/or configurations may depend upon the specific application or applications for which the embodiments is/are used. The embodiments may be practiced in any desired combination. Also, various concepts may be embodied as one or more methods, devices or systems, of which an example has been provided. The acts performed as part of a method or operation may be ordered in any suitable way. Accordingly, embodiments may be constructed in which acts are performed in an order different than illustrated, which may include performing some acts simultaneously, even though shown as sequential acts in embodiments. As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. Transitional phrases such as "comprising," "including," "carrying," "having," "containing," "involving," "holding," "composed of," and the like are to be understood to be open-ended, i.e., to mean including but not limited to. The term "approximately," refers to plus or minus 10% of the value given.

The term "approximately" as used herein refers to plus or minus 10% of the value given. The term "about," refers to plus or minus 20% of the value given. The term "principally" with respect to reflected light, refers to light reflected by a grating structure. Light that is principally reflected at a recited angle includes more light than is reflected at any other angle (excluding surface reflections). Light that is principally reflected about a recited reflective axis includes more reflected light than is reflected about any other reflective axis (excluding surface reflections). Light reflected by a device surface is not included when considering principally reflected light. The term "reflective axis" refers to an axis that bisects an angle of incident light relative to its reflection. The absolute value of an angle of incidence of the incident light relative to the reflective axis is equal to the absolute value of the angle of reflection of the incident light's reflection, relative to the reflective axis. For conventional mirrors, the reflective axis is coincident with surface normal (i.e., the reflective axis is perpendicular to the mirror surface). Conversely, implementations of skew mirrors according to the present disclosure may have a reflective axis that differs from surface normal, or in some cases may have a reflective axis that is coincident with surface normal. A reflective axis angle may be determined by adding an angle of incidence to its respective angle of reflection, and dividing the resulting sum by two. Angles of incidence and angles of reflection can be determined empirically, with multiple measurements (generally three or more) used to generate a mean value.

The term "reflection" and similar terms are used in this disclosure in some cases where "diffraction" might ordinarily be considered an appropriate term. This use of "reflection" is consistent with mirror-like properties exhibited by skew mirrors and helps avoid potentially confusing terminology. For example, where a grating structure is said to be configured to "reflect" incident light, a conventional artisan might prefer to say the grating structure is configured to "diffract" incident light, since grating structures are generally thought to act on light by diffraction. However, such use of the term "diffract" would result in expressions such as "incident light is diffracted about substantially constant reflective axes," which could be confusing. Accordingly, where incident light is said to be "reflected" by a grating structure, persons of ordinary skill in art, given the benefit of this disclosure, will recognize that the grating structure is in fact "reflecting" the light by a diffractive mechanism. Such use of "reflect" is not without precedent in optics, as conventional mirrors are generally said to "reflect" light despite the predominant role diffraction plays in such reflection. Artisans of ordinary skill thus recognize that most "reflection" includes characteristics of diffraction, and "reflection" by a skew mirror or components thereof also includes diffraction.

The term "light" refers to electromagnetic radiation. Unless reference is made to a specific wavelength or range of wavelengths, such as "visible light," which refers to a part of the electromagnetic spectrum visible to the human eye, the electromagnetic radiation can have any wavelength. The terms "hologram" and "holographic grating" refer to a recording of an interference pattern generated by interference between multiple intersecting light beams. In some examples, a hologram or holographic grating may be generated by interference between multiple intersecting light beams where each of the multiple intersecting light beams remains invariant for an exposure time. In other examples, a hologram or holographic grating may be generated by interference between multiple intersecting light beams where an angle of incidence of at least one of the multiple intersecting light beams upon the grating medium is varied while the hologram is being recorded, and/or where wavelengths are varied while the hologram is being recorded (e.g., a complex hologram or complex holographic grating).

The term "sinusoidal volume grating" refers to an optical component which has an optical property, such as refractive index, modulated with a substantially sinusoidal profile throughout a volumetric region. Each (simple/sinusoidal) grating corresponds to a single conjugate vector pair in k-space (or a substantially point-like conjugate pair distribution in k-space). The term "diffraction efficiency" refers to the ratio of the power of reflected light to incident light and on a grating medium. The term "entrance pupil" refers to a real or virtual aperture passing a beam of light, at its minimum size, entering into imaging optics. The term "eye box" refers to a two-dimensional area outlining a region wherein a human pupil may be placed for viewing the full field of view at a fixed distance from a grating structure. The term "eye relief" refers to a fixed distance between a grating structure and a corresponding eye box. The term "exit pupil" refers to a real or virtual aperture passing a beam of light, at its minimum size, emerging from imaging optics. In use, the imaging optics system is typically configured to direct the beam of light toward image capture means. Examples of image capture means include, but are not limited to, a user's eye, a camera, or other photodetector. In some cases, an exit pupil may comprise a subset of a beam of light emerging from imaging optics.

The term "grating medium" refers to a physical medium that is configured with a grating structure for reflecting light. A grating medium may include multiple grating structures. The term "grating structure" refers to one or more gratings configured to reflect light. In some examples, a grating structure may include a set of gratings that share at least one common attribute or characteristic (e.g., a same wavelength of light to which each of the set of gratings is responsive). In some implementations, a grating structure may include one or more holograms. In other implementations, a grating structure may include one or more sinusoidal volume gratings. In some examples, the grating structures may be uniform with respect to a reflective axis for each of the one or more gratings (e.g., holograms or sinusoidal gratings). Alternatively or additionally, the grating structures may be uniform with respect to a length or volume for each of the one or more gratings (e.g., holograms or sinusoidal volume gratings) within the grating medium. Skew mirrors as described herein may sometimes also be referred to herein as grating structures, holographic grating structures, or volume holographic grating structures.

In accordance with an embodiment, an optical device is provided that includes a grating medium, a first set of holograms in a first region of the grating medium, where each of the holograms in the first set at least partially overlaps each of the other holograms in the first set, and wherein each of the holograms in the first set has a different respective grating frequency from a first set of grating frequencies, a second set of holograms in a second region of the grating medium, where each of the holograms in the second set at least partially overlaps each of the other holograms in the second set, and where each of the holograms in the second set has a different respective grating frequency from a second set of grating frequencies, the second set of grating frequencies being located within adjacent frequency gaps between the grating frequencies in the first set of grating frequencies.

In accordance with any combination of the above embodiments, the first set of holograms includes a first hologram having a first grating frequency and a second hologram having a second grating frequency that is separated from the first grating frequency by a first adjacent frequency gap.

In accordance with any combination of the above embodiments, the second set of holograms includes a third hologram having a third grating frequency and a fourth hologram having a fourth grating frequency that is separated from the third grating frequency by a second adjacent frequency gap.

In accordance with any combination of the above embodiments, the third grating frequency is in the first adjacent frequency gap.

In accordance with any combination of the above embodiments, the second grating frequency is in the second adjacent frequency gap.

In accordance with any combination of the above embodiments, each of the holograms in the first set has a respective grating vector pointing in a given direction and each of the holograms in the second set has a respective grating vector pointing in the given direction.

In accordance with any combination of the above embodiments, a mean adjacent frequency gap of the first set of holograms is greater than 4.0 sinc peak to sinc nulls.

In accordance with any combination of the above embodiments, the optical device further includes an output coupler that includes the grating medium and the first and second sets of holograms.

In accordance with any combination of the above embodiments, the optical device further includes an input coupler that includes the grating medium and the first and second sets of holograms.

In accordance with any combination of the above embodiments, the optical device further includes a cross-coupler that includes the grating medium and the first and second sets of holograms.

In accordance with any combination of the above embodiments, each of the holograms in the first set has a grating vector that lies within 0.50 degrees of a given angle.

In accordance with another embodiment, an optical system is provided that includes a grating medium having first and second regions, where the second region has first and second sub-regions, a first set of holograms in the first region, where the first set of holograms is configured to diffract a first portion of input light in a first direction and to pass a second portion of the input light to the second region, a second set of holograms in the first sub-region, and a third set of holograms in the second sub-region, where the second and third sets of holograms are configured to diffract the second portion of the input light in a second direction that is different from the first direction, and where the third set of holograms is comb-shifted with respect to the second set of holograms.

In accordance with any combination of the above embodiments, the second set of holograms have first grating frequencies that are separated by adjacent frequency gaps, and the third set of holograms have second grating frequencies that lie within the adjacent frequency gaps of the first grating frequencies.

In accordance with any combination of the above embodiments, a mean adjacent frequency gap of the second set of holograms is greater than 4.0 sinc peak to sinc nulls.

In accordance with any combination of the above embodiments, the first sub-region is interposed between the second sub-region and the first region of the grating medium.

In accordance with any combination of the above embodiments, the first set of holograms have first grating vectors oriented in the first direction, the second set of holograms have second grating vectors oriented in the second direction, and the third set of holograms have third grating vectors oriented in the second direction.

In accordance with any combination of the above embodiments, the grating medium has a third region, the second region being interposed between the first and third regions, the optical system further includes a fourth set of holograms in the third region, where the fourth set of holograms is configured diffract at least some of the second portion of light that is not diffracted by the second and third sets of holograms in a third direction that is different than the first and second directions.

In accordance with another embodiment, a head-mounted display device is provided that includes first and second substrates, a grating medium between the first and second substrates and having first and second non-overlapping regions, co-located first and second holograms in the first region, where the first hologram has a first grating frequency and the second hologram has a second grating frequency that is separated from the first grating frequency by an adjacent frequency gap, andco-located third and fourth holograms in the second region, where the third hologram has a third grating frequency in the adjacent frequency gap.

In accordance with any combination of the above embodiments, the fourth hologram has a fourth grating frequency separated from the third grating frequency by an additional adjacent frequency gap, and the second grating frequency is in the additional adjacent frequency gap.

In accordance with any combination of the above embodiments, the head-mounted display further includes a light source for providing image-bearing light, where the first and second holograms and the third and fourth holograms are configured to diffract at least some of the image-bearing light towards an exit pupil at a fixed distance from a surface of the second substrate.

The foregoing is merely illustrative and various modifications can be made to the described embodiments. The foregoing embodiments may be implemented individually or in any combination.

What is claimed is:

1. An electronic device comprising:
   a medium;
   a first set of gratings in a first region of the medium, wherein the gratings in the first set have different respective grating frequencies from a first set of grating frequencies; and
   a second set of gratings in a second region of the medium, wherein the gratings in the second set have different respective grating frequencies from a second set of grating frequencies, the second set of grating frequencies being within gaps between the grating frequencies in the first set of grating frequencies.

2. The electronic device of claim 1, wherein the first set of gratings comprises a first grating having a first grating frequency and a second grating having a second grating frequency that is separated from the first grating frequency by a first frequency gap.

3. The electronic device of claim 2, wherein the second set of gratings comprises a third grating having a third grating frequency and a fourth grating having a fourth grating frequency that is separated from the third grating frequency by a second frequency gap.

4. The electronic device of claim 3, wherein the third grating frequency is in the first frequency gap, wherein the second grating frequency is in the second frequency gap.

5. The electronic device of claim 1, wherein the gratings in the first set are at least partially overlapping.

6. The electronic device of claim 1, wherein a mean adjacent frequency gap of the first set of gratings is greater than 4.0 sinc peak to sinc nulls.

7. The electronic device of claim 1, further comprising an output coupler that comprises the medium and the first and second sets of gratings.

8. The electronic device of claim 1, further comprising an input coupler that comprises the medium and the first and second sets of gratings.

9. The electronic device of claim 1, wherein the optical device comprises an optical device selected from the group consisting of: a cross-coupler, an input coupler, an output coupler, a diamond expander, and an interleaved coupler.

10. The electronic device of claim 1, wherein each of the gratings in the first set has a grating vector that lies within 0.50 degrees of a given angle, wherein the optical device further comprises four additional sets of gratings in four respective additional regions in the medium, and wherein each of the four additional sets of gratings have grating frequencies within the frequency gaps.

11. An electronic device comprising:
    a medium;
    a first set of gratings in the medium; and
    a second set of gratings in the medium and comb-shifted relative to the first set of gratings.

12. The electronic device of claim 11, further comprising:
    a third set of gratings, wherein the third set of gratings is configured to diffract a first portion of input light in a first direction and to pass a second portion of the input light to the first set of gratings, the first and second sets of gratings being configured to diffract the second portion of the input light in a second direction.

13. The electronic device of claim 12, wherein the first set of gratings have first grating frequencies that are separated by frequency gaps and wherein the second set of gratings have second grating frequencies that lie within the frequency gaps.

14. The electronic device of claim 12, wherein the first set of gratings is interposed between the second set of gratings and the third set of gratings.

15. The electronic device of claim 12, wherein the first set of gratings have first grating vectors oriented in a given direction and wherein the second set of gratings have second grating vectors oriented in the given direction.

16. The electronic device of claim 11, further comprising an output coupler that includes the first and second sets of gratings.

17. A display comprising:
a medium;
first and second gratings in the medium, wherein the first grating has a first frequency and the second grating has a second frequency that is separated from the first frequency by a gap; and
a third grating in the medium, wherein the third grating has a third frequency in the gap.

18. The display of claim 17, further comprising a fourth grating co-located with the third grating, wherein the fourth grating has a fourth frequency separated from the third frequency by an additional gap, and wherein the second frequency is in the additional gap.

19. The display of claim 17, wherein the first and second gratings are co-located in the grating medium.

20. An electronic device comprising:
a waveguide having a medium, wherein the waveguide is configured to propagate light in a direction; and
a set of gratings in the medium, wherein a number of gratings in the set of gratings increases along the direction.

* * * * *

UNITED STATES PATENT AND TRADEMARK OFFICE
CERTIFICATE OF CORRECTION

| | | |
|---|---|---|
| PATENT NO. | : 11,782,273 B2 | Page 1 of 1 |
| APPLICATION NO. | : 16/646935 | |
| DATED | : October 10, 2023 | |
| INVENTOR(S) | : Adam Urness et al. | |

It is certified that error appears in the above-identified patent and that said Letters Patent is hereby corrected as shown below:

On the Title Page

Left Column, Item (71), "Applicant: Akonia Holographies LLC, Longmont, CO (US)" should read
-- Akonia Holographics LLC, Longmont, CO (US) --

Signed and Sealed this
Ninth Day of January, 2024

Katherine Kelly Vidal
*Director of the United States Patent and Trademark Office*